United States Patent
Belknap et al.

(10) Patent No.: US 12,060,133 B2
(45) Date of Patent: *Aug. 13, 2024

(54) PEDAL

(71) Applicant: Kenneth Belknap, Magnolia, TX (US)

(72) Inventors: Kenneth Belknap, Magnolia, TX (US); Matthew Mercier, Windermere, FL (US); Mark Baptista, Orlando, FL (US)

(73) Assignee: Kenneth Belknap, Magnolia, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/544,333

(22) Filed: Dec. 18, 2023

(65) Prior Publication Data

US 2024/0166298 A1 May 23, 2024

Related U.S. Application Data

(63) Continuation of application No. 18/243,420, filed on Sep. 7, 2023, and a continuation of application No. 18/144,443, filed on May 8, 2023, now Pat. No. 11,794,850, and a continuation of application No. 17/993,662, filed on Nov. 23, 2022, now Pat. No. 11,713,094.

(Continued)

(51) Int. Cl.
*B62M 3/08* (2006.01)

(52) U.S. Cl.
CPC ..................................... *B62M 3/08* (2013.01)

(58) Field of Classification Search
CPC ...................................................... B62M 3/08
See application file for complete search history.

(56) References Cited

U.S. PATENT DOCUMENTS

| 4,338,829 A | 7/1982 | Ozaki |
| 4,599,915 A | 7/1986 | Hlavac |

(Continued)

FOREIGN PATENT DOCUMENTS

| CN | 106143770 A | * 11/2016 | ............. B62M 3/08 |
| CN | 106184584 A | 12/2016 | |

(Continued)

OTHER PUBLICATIONS

Translation of CN-106143770-A, Wu, Nov. 23, 2016 (Year: 2016).*

(Continued)

*Primary Examiner* — Vinh Luong
(74) *Attorney, Agent, or Firm* — Quisenberry Law PLLC

(57) ABSTRACT

Various embodiments of a pedal for use on a device such as a bicycle or stationary bicycle are provided. A pedal may include a pedal body member having an internal cavity. The pedal may include an axle having a shaft adapted to extend into the internal cavity. A sliding bearing block may be secured to a distal end of the axle shaft. The pedal body member may rotate around a longitudinal axis of the axle shaft and around an axis through a shaft bearing attached to the axle shaft. The pedal body member may be self-centering and include one or more springs to apply force to move the pedal body member toward a home or resting position relative to the axle shaft. The pedal may be adapted so that the user's foot can be placed on either a top surface or a bottom surface of the pedal body member.

20 Claims, 31 Drawing Sheets

Related U.S. Application Data

(60) Provisional application No. 63/351,945, filed on Jun. 14, 2022, provisional application No. 63/414,608, filed on Oct. 10, 2022, provisional application No. 63/285,115, filed on Dec. 2, 2021.

(56) References Cited

U.S. PATENT DOCUMENTS

| | | | |
|---|---|---|---|
| 5,003,841 | A | 4/1991 | Nagano |
| 5,852,955 | A | 12/1998 | Crisick et al. |
| 6,050,154 | A | 4/2000 | Fan |
| 6,241,639 | B1 | 6/2001 | Hervig |
| 6,393,940 | B1 | 5/2002 | Ueda |
| 9,950,765 | B2 | 4/2018 | Goulet |
| 11,858,587 | B2 | 1/2024 | Inoue |
| 2005/0284253 | A1 | 12/2005 | Hervig |
| 2006/0090590 | A1 | 5/2006 | Malle |
| 2011/0041648 | A1 | 2/2011 | van Eijk |
| 2012/0048060 | A1 | 3/2012 | Arnold |
| 2013/0043665 | A1 | 2/2013 | Laipple et al. |
| 2013/0269477 | A1 | 10/2013 | Williams |
| 2016/0059918 | A1 * | 3/2016 | Hensley ............ B62H 5/001 70/233 |
| 2016/0221633 | A1 | 8/2016 | Goulet, Jr. |
| 2019/0127003 | A1 | 5/2019 | Monteleone |
| 2019/0152559 | A1 | 5/2019 | Jentzsch |
| 2019/0382077 | A1 | 12/2019 | Davis et al. |
| 2021/0347438 | A1 | 11/2021 | Hickernell |

FOREIGN PATENT DOCUMENTS

| | | | |
|---|---|---|---|
| DE | 4007865 | A1 | 9/1991 |
| DE | 102008009639 | A1 | 8/2009 |
| EP | 402512 | A1 | 12/1990 |
| EP | 2535253 | A1 | 12/2012 |
| EP | 3357802 | B1 | 1/2021 |
| KR | 20160011385 | A * | 2/2016 ............ B62M 3/08 |
| TW | M528946 | U | 9/2016 |
| TW | M530162 | U | 10/2016 |
| WO | WO 2016013865 | | 1/2016 |
| WO | WO 2017085335 | A1 | 5/2017 |

OTHER PUBLICATIONS

Translation of KR 20160011385 A, Lee, Feb. 1, 2016 (Year: 2016).*
Teaching an old dog new tricks—The Funn Hover pedal, Sep. 2, 2015 https://www.wideopenmountainbike.com/2015/09/funn-hover-pedal-a-flat-pedal-with-float.
Original_FUNN_8.jpg https://www.vitalmtb.com/photos/features/2016-Mountain-Bike-Components-at-Eurobike,9336/FUNN-8,97169/b.
Notification of Transmittal of The International Search Report and The Written Opinion of The International Searching Authority, or The Declaration (PCT/US2022/05167) 35 pages.
English abstract of DE 102008009639 A1, Takahama, Aug. 27, 2009 (Year: 2009).
Web page entitled "Knee Pain" having url: https://www.sq-lab/en/ergonomics/sqlab-contact-points/the-foot/knee-pain/ Accessed on Aug. 8, 2023. Publication date unknown.
Translation of CN 106184584 A, Wu, Dec. 7, 2016 (Year: 2016).
Define cavity, Microsoft Bing, Aug. 7, 2023 (Year: 2023).
Translation of WO-2016013865 A1, Lee et al., Jan. 28, 2016 (Year: 2016).
Define swivel bearing, Microsoft Bing, May 19, 2024 (Year: 2024).
Is a swivel bearing a self-aligning bearing, Microsoft Bing, May 25, 2024 (Year: 2024).
Define swivel, Microsoft Bing, May 25, 2024 (Year: 2024).

* cited by examiner

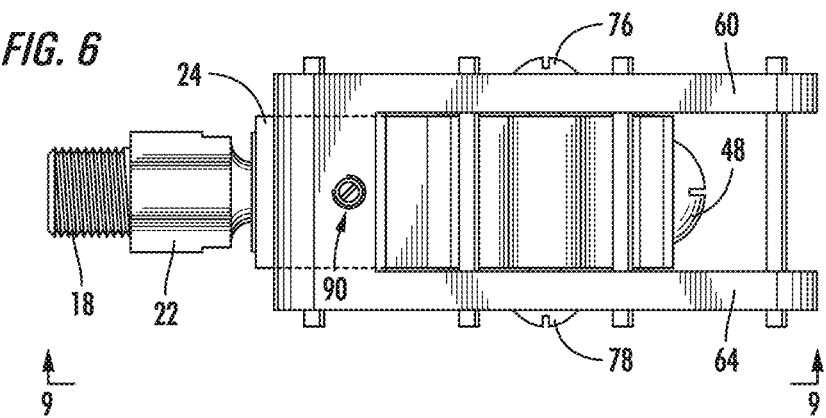
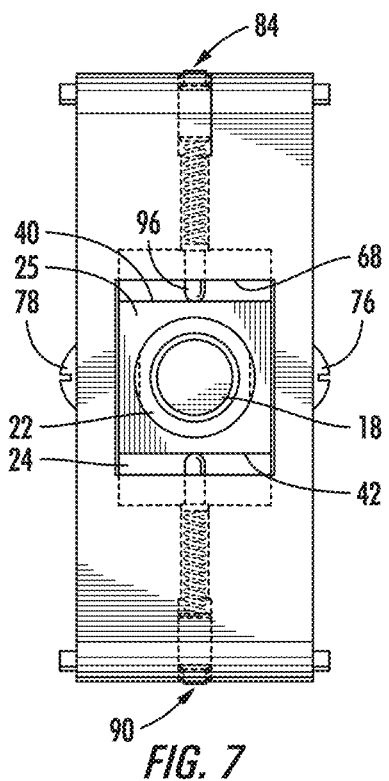
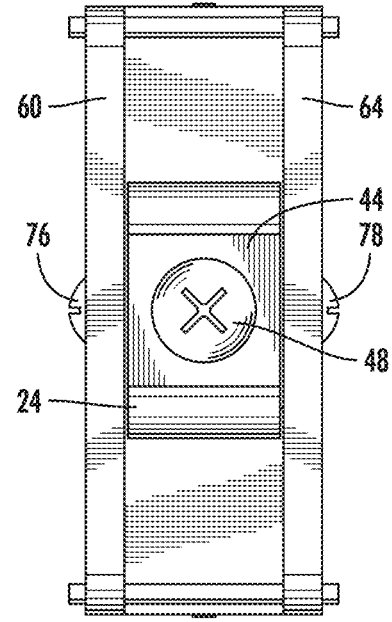
FIG. 6
FIG. 7
FIG. 8

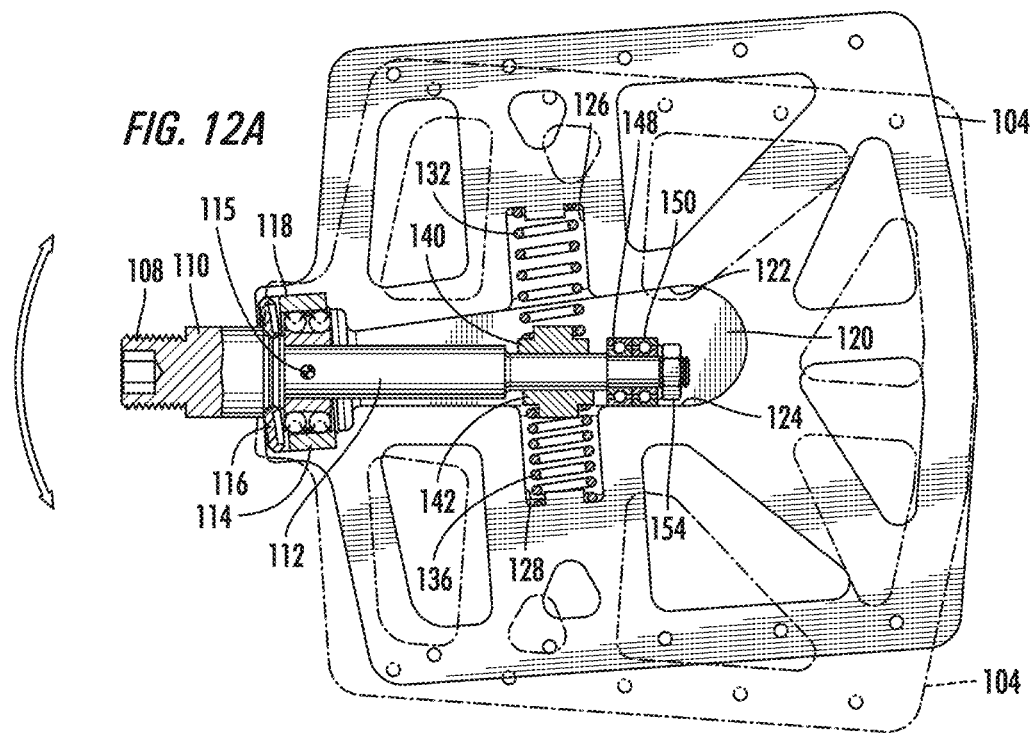
*FIG. 12A*
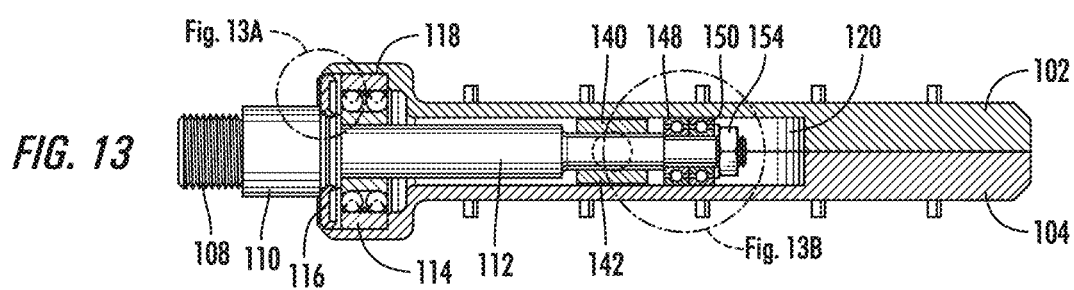
*FIG. 13*
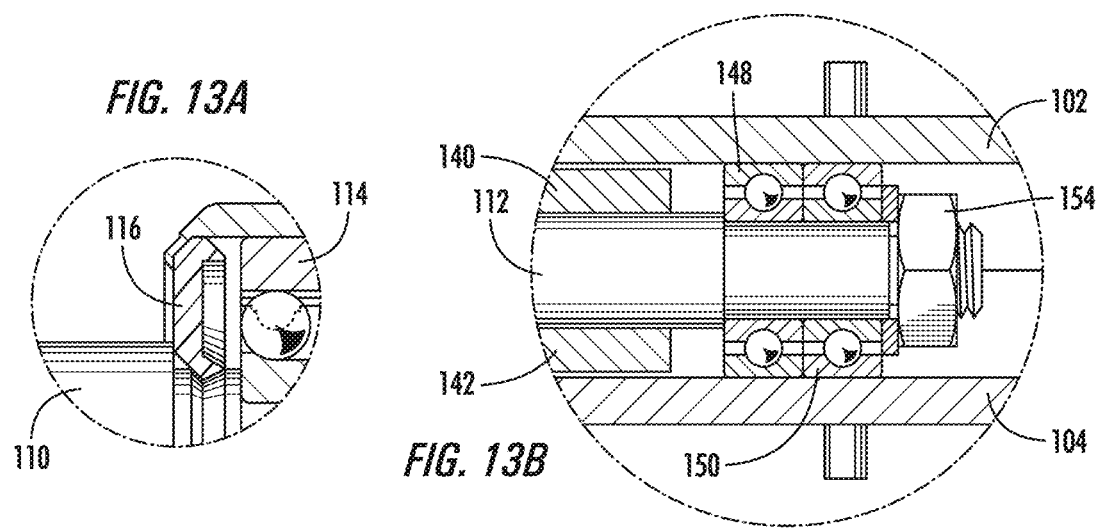
*FIG. 13A*
*FIG. 13B*

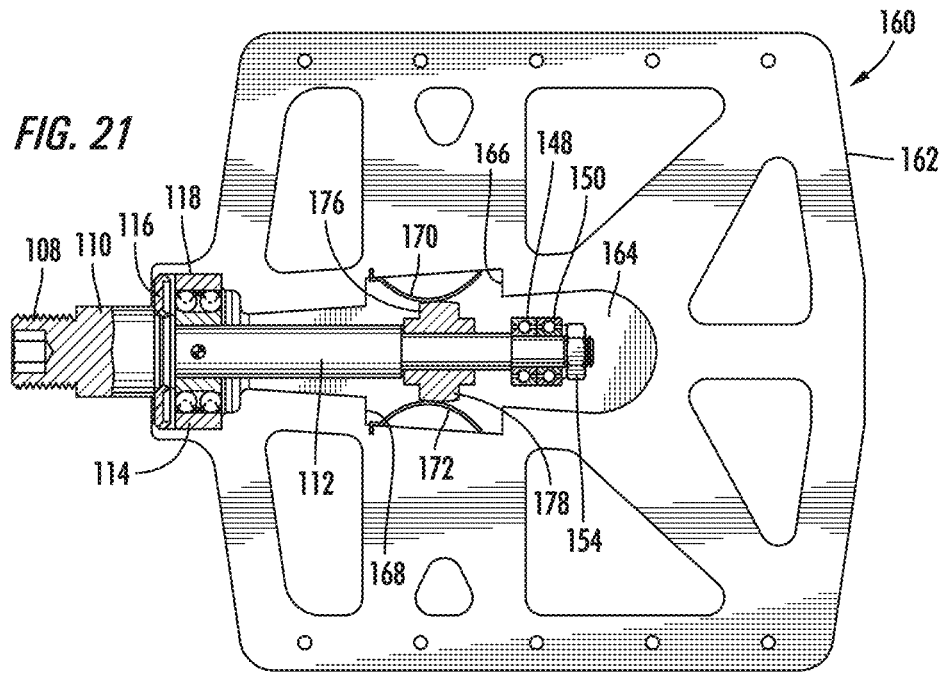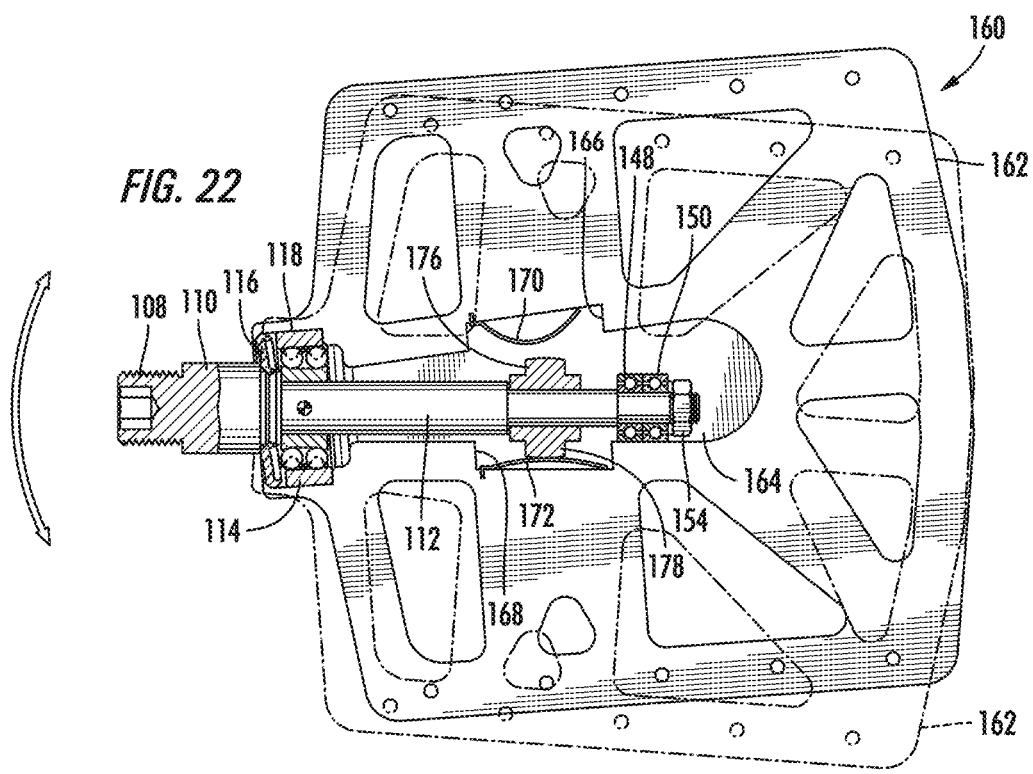

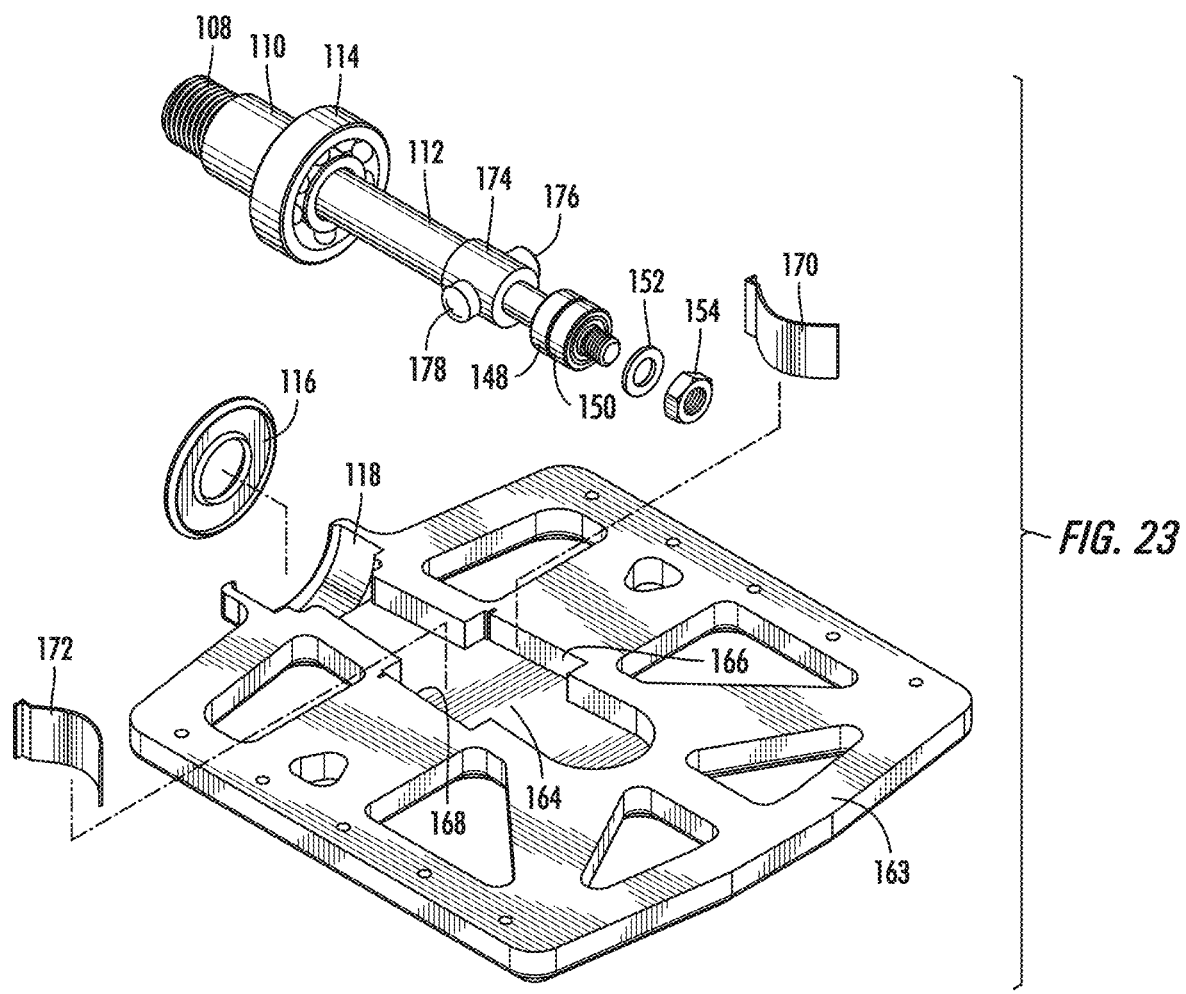

PEDAL

RELATED APPLICATIONS

This application is a continuation of U.S. Non-Provisional patent application Ser. No. 18/243,420, filed Sep. 7, 2023, which is a continuation of U.S. Non-Provisional patent application Ser. No. 18/144,443, filed May 8, 2023 (now U.S. Pat. No. 11,794,850), which is a continuation of U.S. Non-Provisional patent application Ser. No. 17/993,662, filed Nov. 23, 2022 (now U.S. Pat. No. 11,713,094), which claims the benefit of U.S. Provisional Application No. 63/285,115, filed Dec. 2, 2021, U.S. Provisional Application No. 63/351,945, filed Jun. 14, 2022, and U.S. Provisional Application No. 63/414,608 filed Oct. 10, 2022. Each of the foregoing applications and the contents thereof are fully incorporated herein by reference in their entireties.

BACKGROUND OF THE INVENTIONS

1. Field of the Inventions

The present inventions generally pertain to bicycles or similar equipment, and more particularly to pedals for use on same.

2. Description of the Related Art

Bicycle pedals are known in the art. A standard and well-known bicycle pedal rotates about one axis, which is coaxial with a threaded axle that threads into a threaded bore on a bicycle crank of a bicycle or exercise bike. One of the drawbacks to presently available bicycle pedals is that they can cause strain on a cyclist's knees because the cyclist's feet are fixed relative to the pedals when riding the bike.

As will become apparent from the description and explanation set forth below, the present inventions overcome the above-described problem by providing various approaches to allowing a cyclist's feet to rotate side-to-side on the pedal as the cyclist is pedaling, such as clockwise or counter-clockwise on a "vertical" axis that may be generally perpendicular to a longitudinal axis of the pedal axle, which results in less strain on a cyclist's knees. The present inventions as discussed below may also be self-centering so that the pedal will return to a home or resting position after the cyclist's foot is removed from the pedal. The present inventions as discussed below may also be adapted so that a cyclist's foot can engage on either side of the pedal.

SUMMARY OF THE INVENTIONS

In one aspect, the present inventions may include a pedal comprising: a pedal body member having a shaft cavity, the shaft cavity having a forward side and a rear side; a shaft bearing mounted to the pedal body member adjacent to a left side of the pedal body member, the shaft bearing having a central pivot axis and being rotatable around the central pivot axis; an axle including a threaded end and a shaft, the shaft extending into the shaft cavity and being rotatably mounted to the shaft bearing adjacent a first location on the axle shaft, the axle shaft having a longitudinal axis perpendicular to the central pivot axis of the shaft bearing; at least one distal bearing rotatably mounted to the axle shaft adjacent a second location on the axle shaft, the first location on the axle shaft being spaced apart from the second location on the axle shaft, the at least one distal bearing being located within the shaft cavity; the pedal body member being rotatable relative to the axle shaft around the central pivot axis; a sliding bearing block secured to a distal end of the axle shaft; a forward spring supported by the pedal body member and positioned to impart a force to move the axle shaft toward the rear side of the shaft cavity; and a rear spring supported by the pedal body member and positioned to impart a force to move the axle shaft toward the forward side of the shaft cavity. Another feature of this aspect of the present inventions may be that the forward spring being positioned to impart a force to a forward side of the sliding bearing block to move the sliding bearing block and axle shaft toward the rear side of the shaft cavity, and the rear spring being positioned to impart a force to move the sliding bearing block and axle shaft toward the forward side of the shaft cavity. Another feature of this aspect of the present inventions may be that the pedal may further include a forward sleeve enclosing a portion of the forward spring and having an enclosed end in contact with a forward cammed surface of the sliding bearing block, and a rear sleeve enclosing a portion of the rear spring and having an enclosed end in contact with a rear cammed surface of the sliding bearing block. Another feature of this aspect of the present inventions may be that the pedal may further include a spherical bearing mount secured to the pedal body member, and the shaft bearing is mounted within the spherical bearing mount. Another feature of this aspect of the present inventions may be that he spherical bearing mount is at least partially mounted within a machined pocket in the pedal body member. Another feature of this aspect of the present inventions may be that the spherical bearing mount is disposed for pivotal movement around the central pivot axis to allow the axle shaft to move laterally within the shaft cavity. Another feature of this aspect of the present inventions may be that the shaft bearing is a self-aligning bearing seated in an annular recess in the pedal body member.

In another aspect, the present inventions may include a pedal comprising: a pedal body member having a shaft cavity, the shaft cavity having a forward side and a rear side; a shaft bearing mounted to the pedal body member adjacent to a left side of the pedal body member, the shaft bearing having a central pivot axis and being rotatable around the central pivot axis; an axle including a threaded end and a shaft, the shaft extending into the shaft cavity and being rotatably mounted to the shaft bearing adjacent a first location on the axle shaft; at least one distal bearing rotatably mounted to the axle shaft adjacent a second location on the axle shaft, the first location on the axle shaft being spaced apart from the second location on the axle shaft, the at least one distal bearing being located within the shaft cavity; the pedal body member being rotatable in a first direction around a longitudinal axis of the axle shaft and in a second direction around the central pivot axis; a sliding bearing block secured to a distal end of the axle shaft; a forward spring supported by the pedal body member and positioned to impart a force to move the axle shaft toward the rear side of the shaft cavity; and a rear spring supported by the pedal body member and positioned to impart a force to move the axle shaft toward the forward side of the shaft cavity. Another feature of this aspect of the present inventions may be that the forward spring being positioned to impart a force to a forward side of the sliding bearing block to move the sliding bearing block and axle shaft toward the rear side of the shaft cavity, and the rear spring being positioned to impart a force to move the sliding bearing block and axle shaft toward the forward side of the shaft cavity. Another feature of this aspect of the present inventions may be that the pedal may further include a forward sleeve enclosing a portion of the forward spring and having an enclosed end in contact with a forward cammed surface of the sliding bearing block, and a rear sleeve enclosing a portion of the rear spring and having an enclosed end in contact with a rear cammed surface of the sliding bearing block. Another feature of this aspect of the present inventions may be that the pedal may further include a spherical bearing mount secured to the pedal body member, and the shaft bearing is mounted within the spherical bearing mount. Another feature of this aspect of the present inventions may be that the spherical bearing mount is at least partially mounted within a machined pocket in the pedal body member. Another feature of this aspect of the present inventions may be that the spherical bearing mount is disposed for pivotal movement around the central pivot axis to allow the axle shaft to move laterally within the shaft cavity. Another feature of this aspect of the present inventions may be that the shaft bearing is a self-aligning bearing seated in an annular recess in the pedal body member.

In yet another aspect, the present inventions may include a pedal comprising: a pedal body member having a shaft cavity, the shaft cavity having a forward side and a rear side; a self-aligning shaft bearing seated in an annular recess in the pedal body member adjacent to a left side of the pedal body member, the self-aligning shaft bearing being rotatably around a first axis; an axle including a threaded end and a shaft, the shaft extending into the shaft cavity and being rotatably mounted to the self-aligning shaft bearing adjacent a first location on the axle shaft, the axle shaft having a longitudinal axis; at least one distal bearing rotatably mounted to the axle shaft adjacent a second location on the axle shaft, the first location on the axle shaft being spaced apart from the second location on the axle shaft; the pedal body member being rotatable in a first direction around the longitudinal axis of the axle shaft and in a second direction around the first axis; a sliding bearing block secured to the axle shaft at a location spaced apart from the self-aligning shaft bearing; a forward spring supported by the pedal body member and positioned to impart a force to move the axle shaft toward the rear side of the shaft cavity; and a rear spring supported by the pedal body member and positioned to impart a force to move the axle shaft toward the forward side of the shaft cavity. Another feature of this aspect of the present inventions may be that the forward spring being positioned to impart a force to a forward side of the sliding bearing block to move the sliding bearing block and axle shaft toward the rear side of the shaft cavity, and the rear spring being positioned to impart a force to move the sliding bearing block and axle shaft toward the forward side of the shaft cavity. Another feature of this aspect of the present inventions may be that the pedal may further include a forward sleeve enclosing a portion of the forward spring and having an enclosed end in contact with a forward cammed surface of the sliding bearing block, and a rear sleeve enclosing a portion of the rear spring and having an enclosed end in contact with a rear cammed surface of the sliding bearing block. Another feature of this aspect of the present inventions may be that the pedal may further include a spherical bearing mount secured to the pedal body member, and the shaft bearing is mounted within the spherical bearing mount. Another feature of this aspect of the present inventions may be that the spherical bearing mount is at least partially mounted within a machined pocket in the pedal body member. Another feature of this aspect of the present inventions may be that the spherical bearing mount is disposed for pivotal movement around the first axis to allow the axle shaft to move laterally within the shaft cavity.

Other features, aspects and advantages of the present inventions will become apparent from the following discussion and detailed description.

BRIEF DESCRIPTION OF THE DRAWINGS

FIG. 6 is a front view of the pedal as shown in FIG. 2 as indicated by arrows 6-6.

FIG. 7 is a left side view of the pedal as shown in FIG. 2 as indicated by arrows 7-7.

FIG. 8 is a right side view of the pedal as shown in FIG. 2 as indicated by arrows 8-8.

FIG. 12A is a top view of the pedal shown in FIGS. 11 and 12 with an outline of a pedal body member in dashed lines and rotated relative to an axle.

FIG. 13 is a side view in partial cross section taken along a line indicated by arrows 13-13 of FIG. 11.

FIG. 13A is an enlarged view of a corresponding portion of the pedal shown in FIG. 13.

FIG. 13B is an enlarged view of a corresponding portion of the pedal shown in FIG. 13.

FIG. 21 is a top view of another specific embodiment of a pedal constructed in accordance with another aspect of the present inventions.

FIG. 22 is a top view of the pedal shown in FIG. 21 with an outline of a pedal body member in dashed lines and rotated relative to an axle.

FIG. 23 is an exploded view of the pedal shown in FIGS. 21 and 22.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

The present inventions will be described in various representative embodiments, as explained below. However, the scope of the present inventions are not limited to any of the details of the embodiments discussed below. Reference should be made to the appended claims, each of which defines a separate and distinct invention that is part of the present inventions.

First Embodiment

Figure 1:
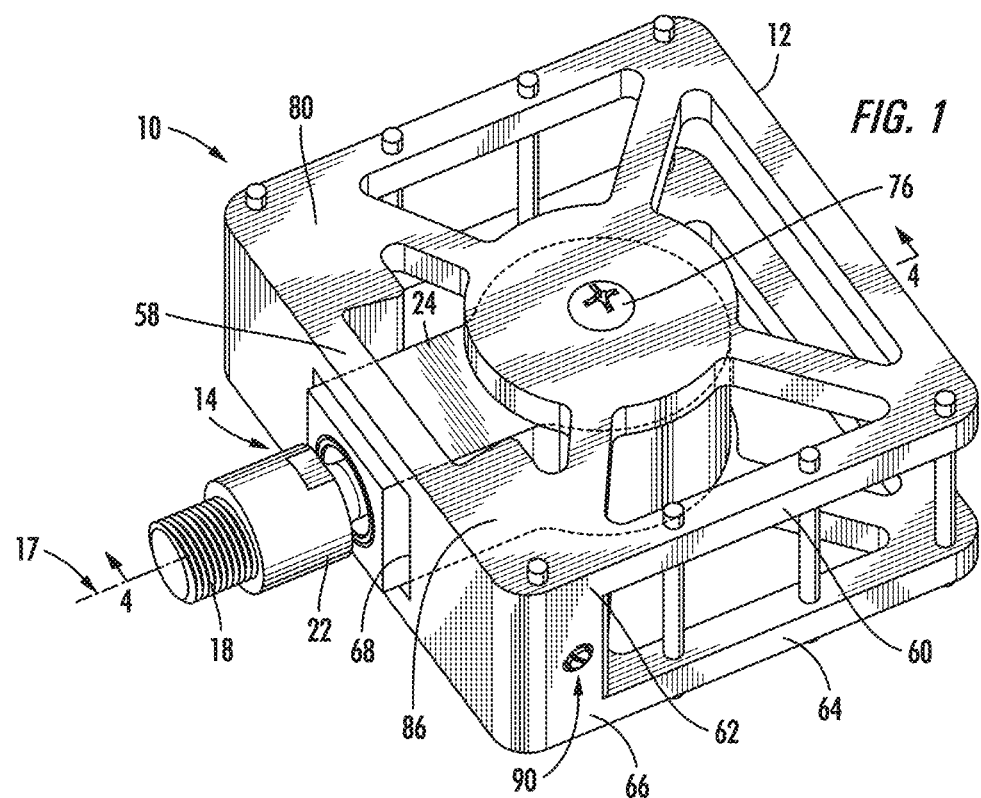
FIG. 1 is a perspective view of a specific embodiment of a pedal constructed in accordance with one aspect of the present inventions.
Figure 5:
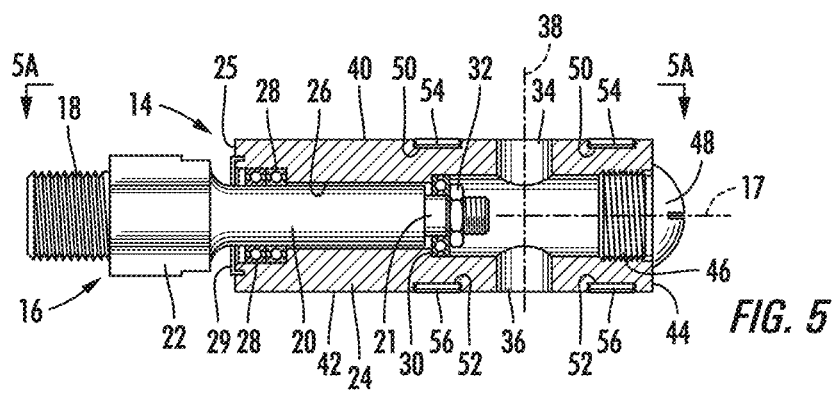
FIG. 5 is a side cross-sectional view of an axle assembly that forms part of the pedal as shown in FIGS. 1-4.
Figure 5A:
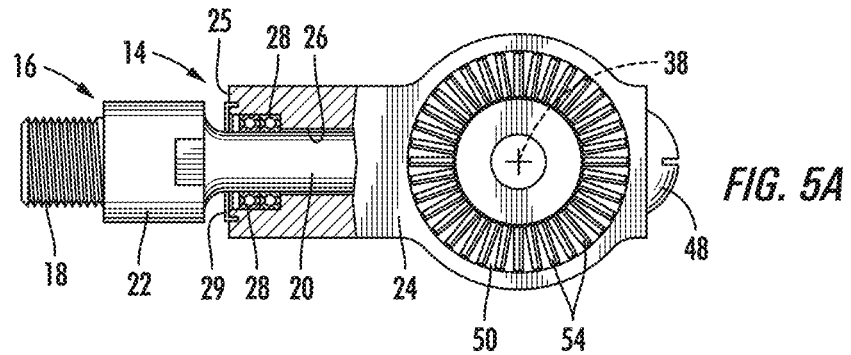
FIG. 5A is a top view of the axle assembly of FIG. 5 as indicated by arrows 5A-5A.

Referring to the drawings in detail, wherein like numerals denote identical elements throughout the several views, and referring initially to FIG. 1, there is shown a perspective view of a specific embodiment of a dual axis pedal 10 that may include a pedal body member 12 and an axle assembly 14. As best shown in FIGS. 5 and 5A, the axle assembly 14 may include an axle 16 having a threaded end 18, a shaft 20, and a hub 22 disposed between the threaded end 18 and the shaft 20. The threaded end 18 may be adapted for threadable engagement with a bicycle crank (not shown). The axle 16 includes a longitudinal axis 17 as shown in FIG. 1, which is also the longitudinal axis of the shaft 20.

The axle assembly 14 may also include a rotatable housing 24. In a specific embodiment, the rotatable housing 24 may be in the form of a rectangular block. In a specific embodiment, the rotatable housing 24 includes a main longitudinal bore 26 extending from a first end 25 of the rotatable housing 24, and adapted to receive the axle shaft 20. The main longitudinal bore 26 includes a main longitudinal axis that coincides with the longitudinal axis 17 of the shaft 20. A plurality of bearings may be provided to rotatably mount the axle shaft 20 within the main longitudinal bore 26. In a specific embodiment, one or more first or left bearings 28 may be mounted around the shaft 20 within a first annular recess in the main longitudinal bore 26 adjacent the first end 25 of the rotatable housing 24. The axle assembly 14 may also include a seal 29 adjacent the one or more first or left bearings 28. In a specific embodiment, at least one second or right bearing 30 may be mounted around a distal end 21 of the axle shaft 20 within a second annular recess in the main longitudinal bore 26. The distal end 21 of the axle shaft 20 may be threaded and adapted to receive a nut 32 adapted to secure the second or right bearing 30 between the nut 32 and an annular wall or shoulder of the second annular recess, thereby securing the shaft 20 to the rotatable housing 24 such that the rotatable housing 24 will rotate or spin around the axle shaft 20.

In a specific embodiment, the rotatable housing 24 may include a first orthogonal bore 34 and a second orthogonal bore 36, each of which may be aligned with the other and share a common orthogonal axis 38. In a specific embodiment, the common orthogonal axis 38 may intersect and be substantially orthogonal or perpendicular to the main longitudinal axis 17 of the axle shaft 20 and the main longitudinal bore 26. The first orthogonal bore 34 may extend from a first surface 40 of the rotatable housing 24 to the main longitudinal bore 26. The second orthogonal bore 36 may extend from a second surface 42 of the rotatable housing 24. In a specific embodiment, the first and second orthogonal bores 34 and 36, including the common orthogonal axis 38, may be located between the threaded end of the shaft 20 and a second end 44 of the rotatable housing 24. In a specific embodiment, as best seen in FIG. 5, the main longitudinal bore 26 may extend all the way through the rotatable housing 24 from its first end 25 to its second end 44. A distal end of the main longitudinal bore 26 may include internal threads 46 adjacent the second end 44 of the rotatable housing 24. A removable threaded cap 48 may be threadably engaged with the internal threads 46 to enclose the distal end of the main longitudinal bore 26, and provide selective access thereto.

In a specific embodiment, the first surface 40 of the rotatable housing 24 may include a first annular recess 50. The second surface 42 of the rotatable housing 24 may include a second annular recess 52. The rotatable housing 24 may include a first annular bearing 54 (such as a flat thrust bearing) disposed in the first annular recess 50. The rotatable housing 24 may include a second annular bearing 56 (such as a flat thrust bearing) disposed in the second annular recess 52.

Figure 4:
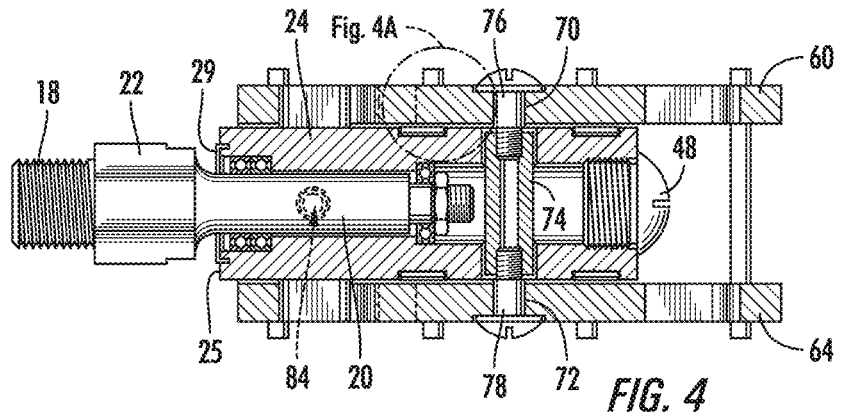
FIG. 4 is a side cross-sectional view of the pedal shown in FIG. 1 as indicated by arrows 4-4.
Figure 4A:
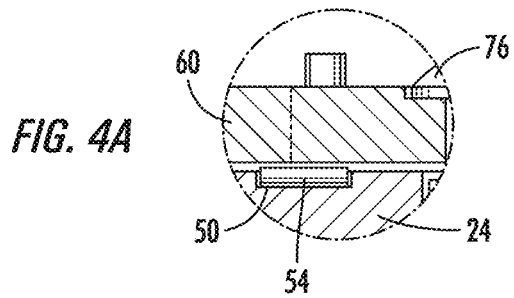
FIG. 4A is an enlarged view of a corresponding portion of the pedal shown in FIG. 4.

Referring now to FIG. 1, the pedal body member 12 may include a first wall 58 having a top plate 60 extending from a top end 62 of the first wall 58, and a lower plate 64 extending from a lower end 66 of the first wall 58. The top and lower plates 60 and 64 may be disposed in generally parallel relationship to one another. The first wall 58 may include a window 68 that may be centrally positioned through the first wall 58. As shown in FIG. 4, the top plate 60 may include a top bore 70, and the lower plate 64 may include a lower bore 72. In a specific embodiment, the top and lower bores 70 and 72 may be aligned along a common longitudinal axis. In a specific embodiment, the top and lower bores 70 and 72 may be positioned in the center of the pedal body member. In other specific embodiments, the top and lower bores 70 and 72 may be positioned at any other location in the pedal body. In a specific embodiment, the axle assembly 14 may be positioned at a location corresponding to the position of the top and lower bores 70 and 72, such as through the center of the pedal body member 12.

As best shown in FIGS. 1 and 4, the rotatable housing 24 is adapted so that the first end 25 of the rotatable housing 24 may be disposed through the window 68 in the pedal body member 12, and the second end 44 of the rotatable housing 24 may be disposed between the top and lower plates 60 and 64 with the common orthogonal axis 38 of the first and second orthogonal bores 34 and 36 in the rotatable housing 24 aligned with the common longitudinal axis of the top and lower bores 70 and 72, respectively, in the pedal body member 12. As shown in FIG. 4, a sleeve 74 may be disposed through the first and second orthogonal bores 34 and 36. An upper end of the sleeve 74 may include internal threads adapted for threadable engagement with a top screw 76 disposed through the top bore 70 in the top plate 60 of the pedal body member 12. A lower end of the sleeve 74 may include internal threads adapted for threadable engagement with a lower screw 78 disposed through the lower bore 72 in the lower plate 64 of the pedal body member 12. In this manner, the pedal body member 12 is adapted for rotatable movement around the orthogonal axis 38 relative to the axle shaft 20. The pedal 10 may be provided with mechanical stops (such as the reciprocating plungers 96 and 97 discussed below) to limit the pivot range in either direction around the orthogonal axis 38. When the rotatable housing 24 is installed in this manner, the first annular bearing 54 may be in contact with a lower surface of the top plate 60, and the second annular bearing 56 may be in contact with an upper surface of the lower plate 64 so as to facilitate rotatable movement of the pedal body member 12 relative to the orthogonal axis 38 as discussed above.

Figure 2A:
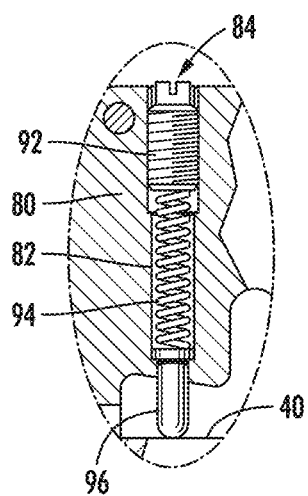
FIG. 2A is an enlarged view of a corresponding portion of the pedal shown in FIG. 2.
Figure 2:
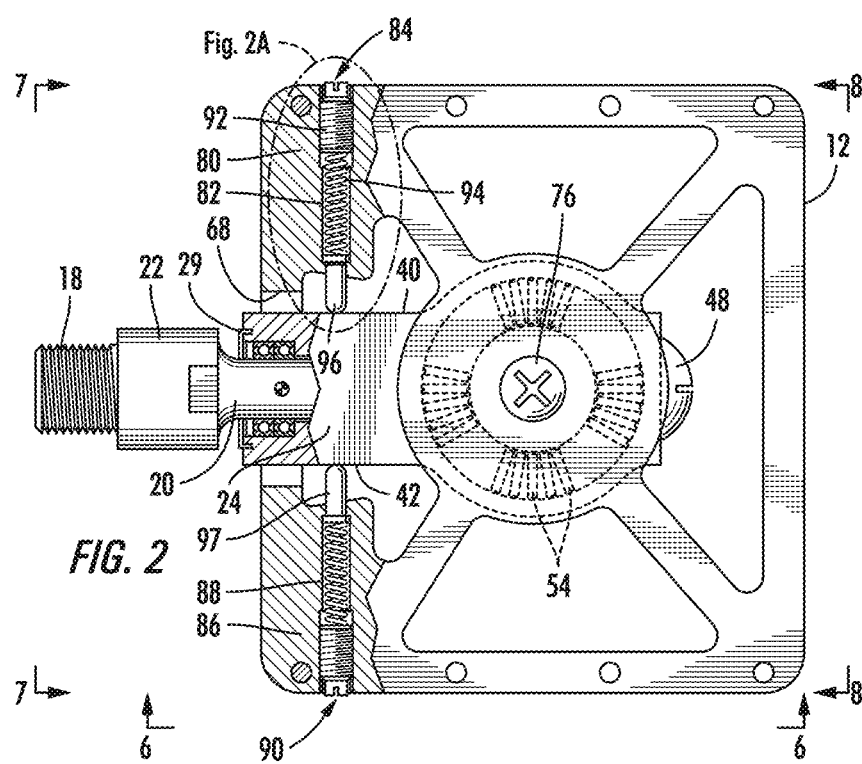
FIG. 2 is a top view in partial cross-section of the pedal shown in FIG. 1.
Figure 3:
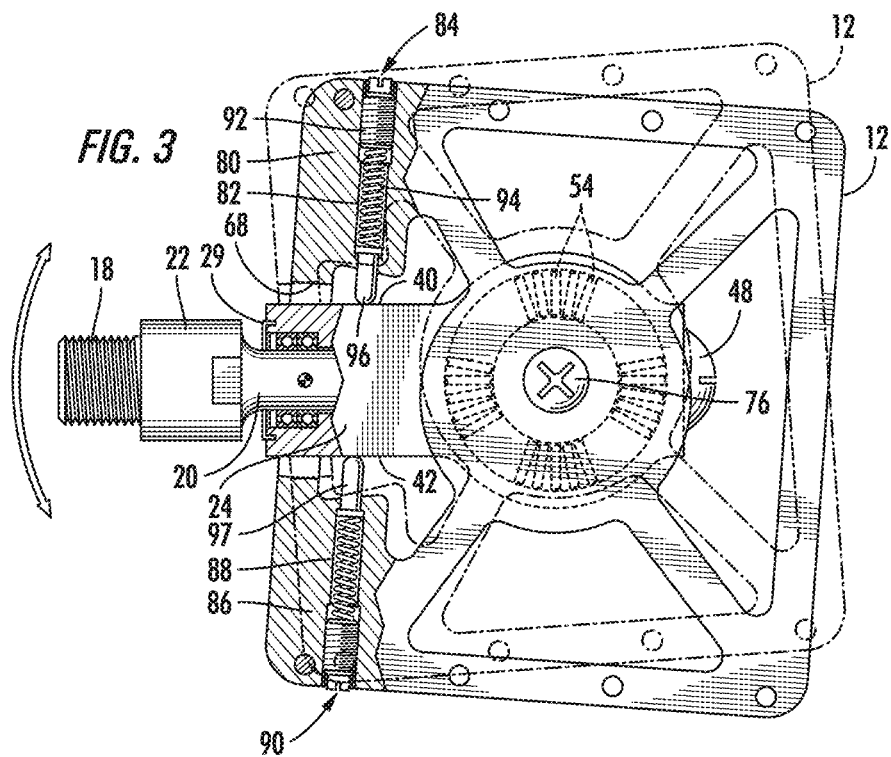
FIG. 3 is a top view of the pedal shown in FIGS. 1 and 2 with an outline of a pedal body member in dashed lines and rotated relative to an axle.

As shown for example in FIGS. 2 and 3, the pedal body member 12 may be self-centering and may include a plurality of springs adapted to apply force against the rotatable housing 24 to hold the pedal body member 12 in a home position and to urge the pedal body member 12 back to its home position after it has been rotated away from its home position. Referring to FIG. 2, a first side 80 of the first wall 58 may include a first spring bore 82 adapted for housing a first spring-loaded tension adjustable screw assembly 84. A second side 86 of the first wall 58 may include a second spring bore 88 adapted for housing a second spring-loaded tension adjustable screw assembly 90. The first and second spring-loaded tension adjustable screw assemblies 84 and 90 may be used to adjust the preferred resistance that must be overcome to rotate the pedal body member 12 relative to the rotatable housing 24.

As best seen in FIG. 2A, in a specific embodiment, the first spring-located tension adjustable screw assembly 84 may include a body member 92, a spring 94, and a reciprocating plunger 96. The body member 92 may be threadably secured in the first spring bore 82, and be adapted to hold the spring 94 within the first spring bore 82 between a lower end of the body member 92 and the reciprocating plunger 96. The reciprocating plunger 96 may include a head that is adapted for reciprocating movement within the first spring bore 82 when a distal end of the plunger 96 that is in contact with the first surface of the rotatable housing 24 is depressed in response to rotation of the pedal body member 12 relative to the rotatable housing 24. The structure and operation of the second spring-loaded tension adjustable screw assembly 90 having a reciprocating plunger 97 may be the same as explained above for the first spring-loaded tension adjustable screw assembly 84.

Figure 9:
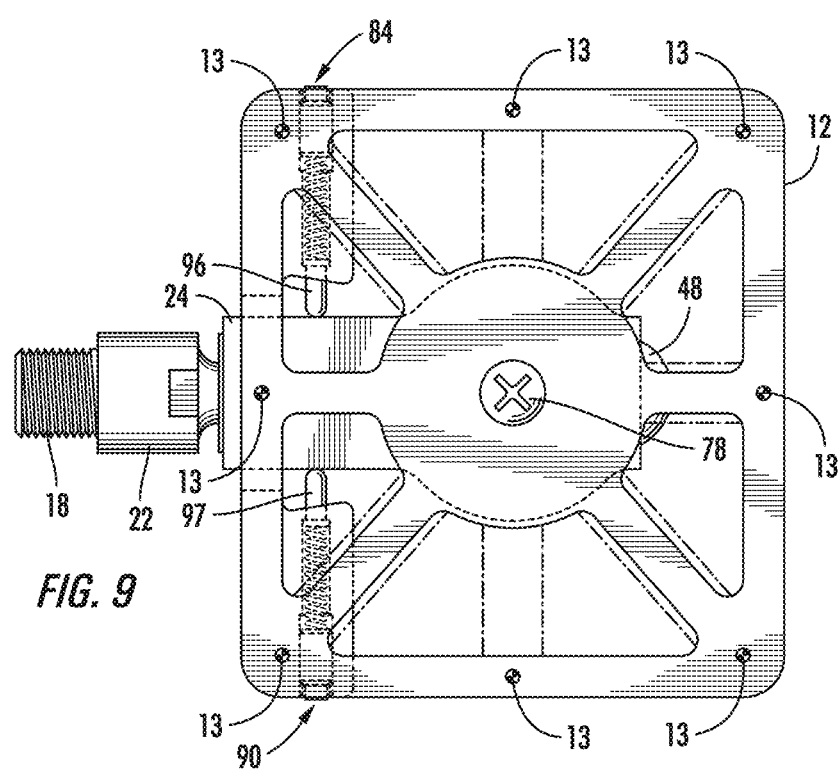
FIG. 9 is a top view of the pedal as shown in FIGS. 1-8.

With reference to FIG. 9, in other specific embodiments, the pedal body member 12 may be adapted for rotation about some axis other than the axis 38, such as an axis corresponding to any of pins 13.

Second Embodiment

Another specific embodiment of a pedal 98 is shown in FIGS. 11-20. In a specific embodiment, the pedal 98 may include a pedal body member 100 that may be formed from an upper pedal body member 102 and a lower pedal body member 104. The pedal 98 also includes an axle 106 having a threaded end 108, a hub 110, and a shaft 112. The pedal axle 98 is adapted for threadable engagement with a bicycle crank (not shown). A self-aligning bearing 114 is mounted around the pedal shaft 112 adjacent the hub 110 of the pedal axle 98. In a specific embodiment, the self-aligning bearing 114 may be of the type that has an outer race and an inner race that pivots in opposite directions relative to the outer race. The self-aligning bearing 114 may have a central pivot axis 115. The self-aligning bearing 114 may be positioned on a left side of the pedal body member 100. In a specific embodiment, an annular seal member 116 may be disposed around the pedal shaft 112 between the axle hub 110 and the self-aligning bearing 114. The self-aligning bearing 114 is seated in an annular recess 118, half of which is formed in the lower pedal body member 104 (see FIG. 16), and half of which is formed in the upper pedal body member 102.

Figure 12:
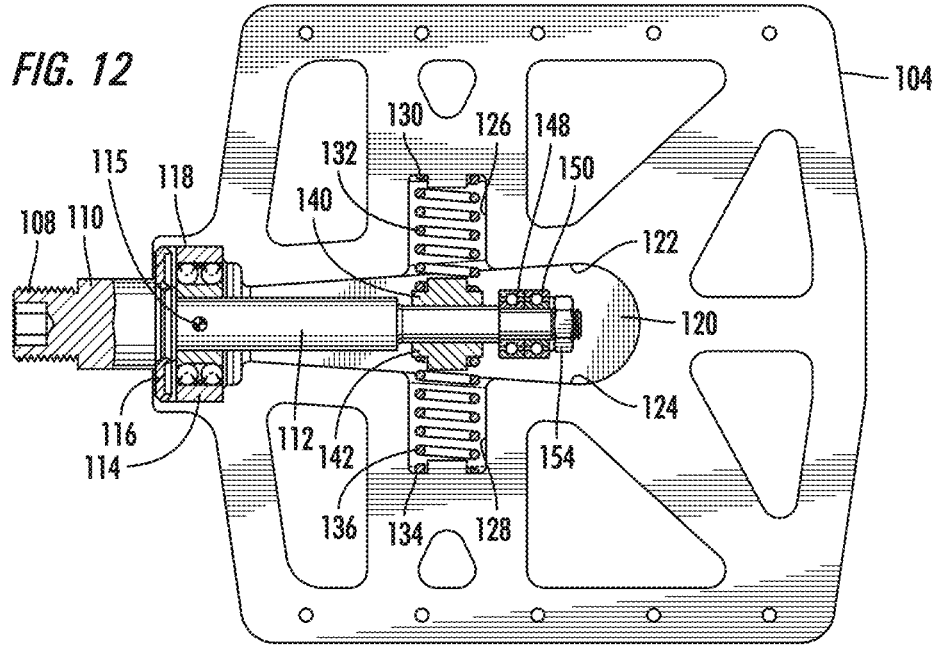
FIG. 12 is a top view in partial cross section taken along a line indicated by arrows 12-12 of FIG. 11.
Figure 14:
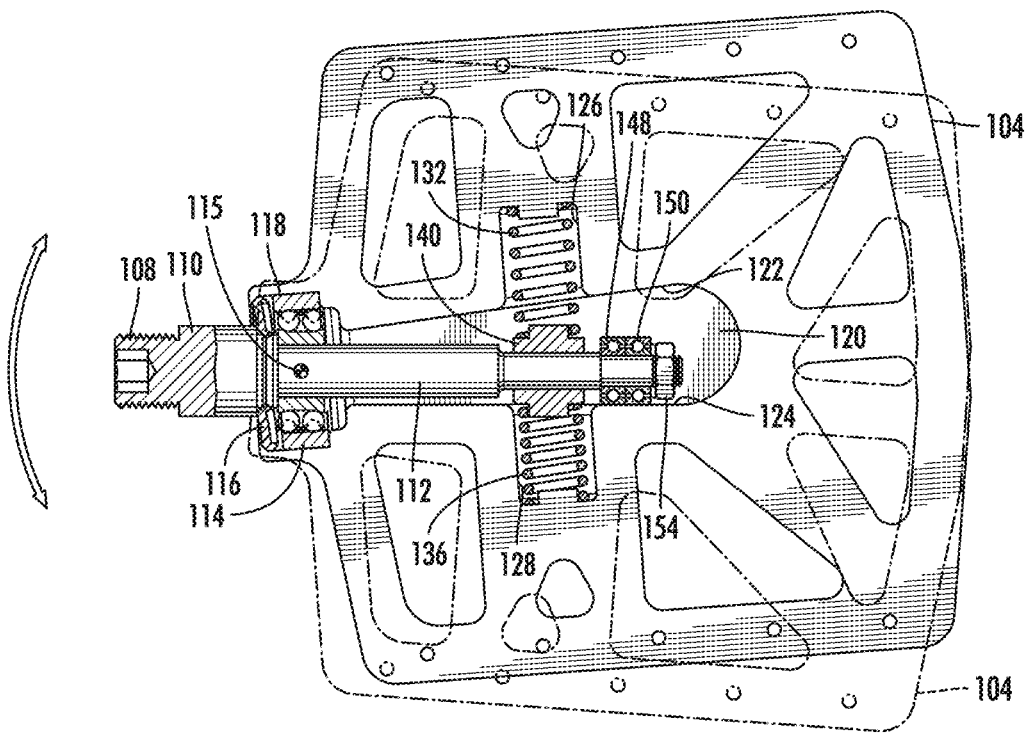
FIG. 14 is a top view of the pedal shown in FIGS. 11-13 with an outline of a pedal body member in dashed lines and rotated relative to an axle.
Figure 15:
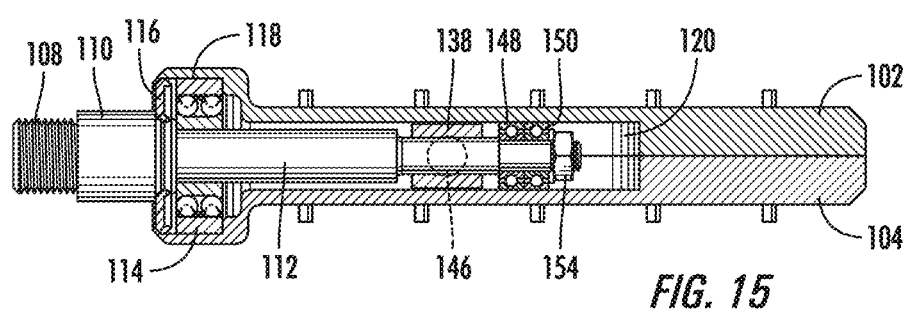
FIG. 15 is a front cross-sectional view of the pedal shown in FIGS. 11-14.

The pedal shaft 112 extends into a shaft cavity 120 within the pedal body member 100. In a specific embodiment, half of the pedal body member 100 may be formed in the lower pedal body member 104 (see FIG. 16), and half of it may be formed in the upper pedal body member 102. The pedal body member 100 may also be a one-piece construction, for example. As shown for example in FIG. 12, the shaft cavity 120 includes opposed forward and rear side walls 122 and 124. The self-aligning bearing 114 functions to allow the pedal body member 100 to rotate around an axis perpendicular to the longitudinal axis of the axle shaft 112. With reference to FIG. 12, if a cyclist's right foot is on top of the pedal body member 100 (if on the right side of a bicycle) and the foot is rotated counterclockwise, the pedal body member 100 will rotate until the bearings 148 and 150 come into contact with the rear side wall 124 of the shaft cavity 120. Similarly, if the right foot is rotated clockwise, the pedal body member 100 will rotate until the bearings 148 and 150 come into contact with the forward side wall 122 of the shaft cavity 120. In a specific embodiment, the self-aligning bearing 114 may be configured to allow for pivoting of the pedal body member 100 about the central pivot axis 115 in amount equal to plus or minus 4 degrees from neutral.

In a specific embodiment, the opposed forward and rear side walls 122 and 124 may diverge away from each other going away from the threaded end 108 of the pedal axle 112. In a specific embodiment, the angle of divergence for each wall may be plus or minus 4 degrees (by virtue of the configured rotational radius of the self-aligning bearing 114 as discussed above). In this specific embodiment, the total range of movement of the pedal body member 100 relative to the pedal axle 112 would be 8 degrees. This is just an example. The inventions are not limited to any particular number of degrees of rotation or movement. Other ranges of rotation and movement are also within the scope of the present inventions.

In a specific embodiment, the pedal body member 100 may be self-centering. As shown in FIG. 12, the pedal body member 100 may also include a forward internal spring bore 126, half of which may be formed in the lower pedal body member 104 (see FIG. 16), and half of which may be formed in the upper pedal body member 102. The pedal body member 100 may also include a rear internal spring bore 128, half of which may be formed in the lower pedal body member 104 (see FIG. 16), and half of which may be formed in the upper pedal body member 102. A distal end of the forward internal spring bore 126 may include an annular recess 130 adapted for receiving a forward end of a forward spring 132. A distal end of the rear internal spring bore 128 may include an annular recess 134 adapted for receiving a rear end of a rear spring 136. In a specific embodiment, each of the forward and rear internal spring bores 126 and 128 may extend away from the shaft cavity 120 in a generally perpendicular orientation relative to a longitudinal axis of the shaft cavity 120.

Figure 16:
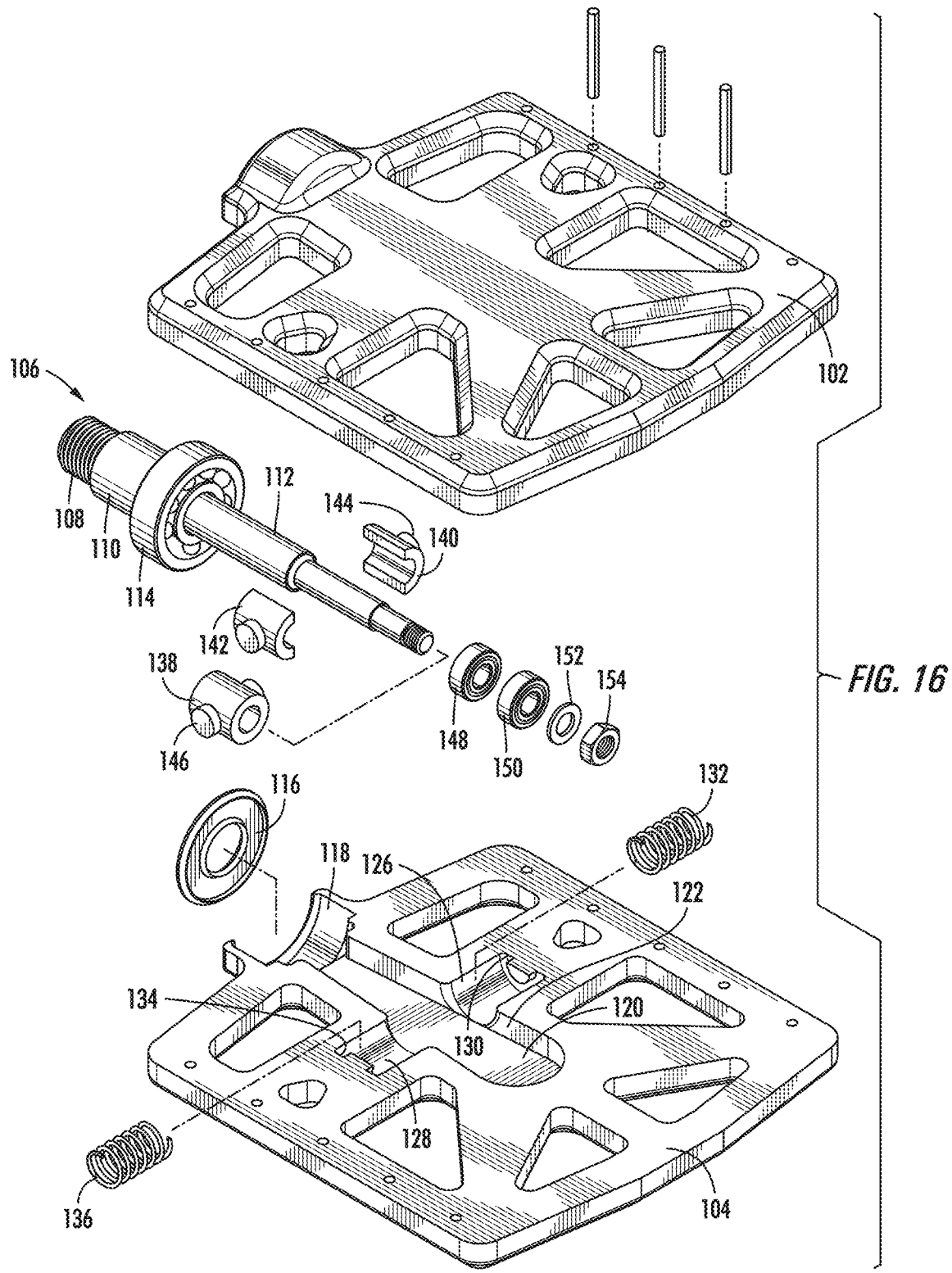
FIG. 16 is an exploded view of the pedal shown in FIGS. 11-15.
Figure 17:
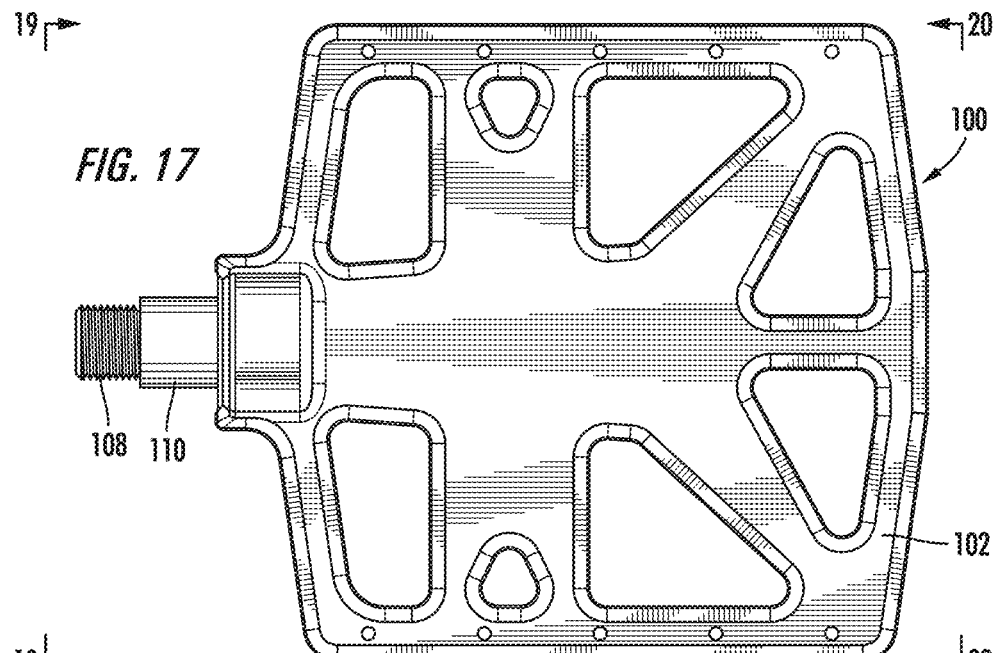
FIG. 17 is a top view of the pedal shown in FIGS. 11-16.
Figure 18:
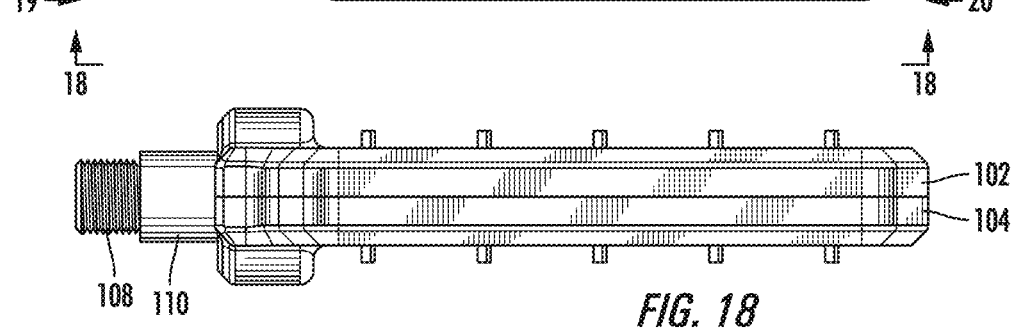
FIG. 18 is a front view of the pedal as shown in FIG. 17 as indicated by arrows 18-18.
Figure 19:
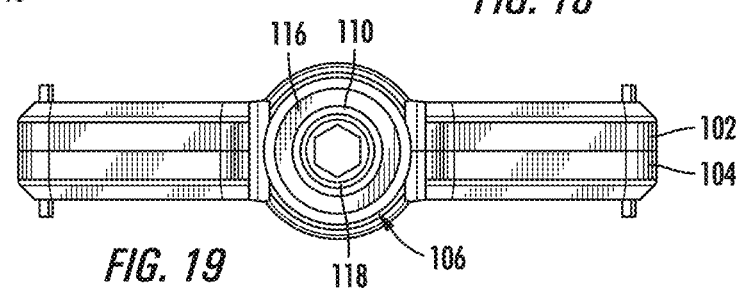
FIG. 19 is a left side view of the pedal as shown in FIG. 17 as indicated by arrows 19-19.
Figure 20:
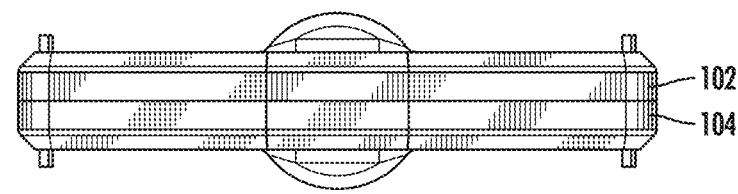
FIG. 20 is a right side view of the pedal as shown in FIG. 17 as indicated by arrows 20-20.

With reference to FIG. 16, the pedal 98 may include a two-piece collar 138 having a forward half collar 140 and a rear half collar 142 disposed around the axle shaft 112. The forward half collar 140 may include a forward cylindrical stud 144 adapted to engage a rear end of the forward spring 132. The rear half collar 142 may include a rear cylindrical stud 146 adapted to engaged a forward end of the rear spring 136. The forward and rear half collars 140 and 142 may slide independently along the axle shaft 112 depending on how the springs 132 and 136 imparted force to the half collars 140 and 142, respectively, depending on the direction of movement of the pedal body member 100 relative to the axle shaft 112.

In a specific embodiment, the springs 132 and 136 in combination with the collar halves 140 and 142 may comprise a self-centering spring mechanism in mating engagement with the axle shaft 112. In a specific embodiment, the springs 132 and 136 may have equal resistance. In operation, the spring mechanism may hold the pedal axle 112 in a home position that is generally centered within the shaft cavity 120.

In a specific embodiment, a distal end of the axle shaft 112 may include a stepped down end section adapted to receive a first end bearing 148 and a second end bearing 150 rotatably mounted around the axle 112. The distal end of the axle shaft 112 may be threaded and adapted to receive a washer 152 and a nut 154 to retain the bearings 148 and 150 against the shoulder defined at the transition in the axle shaft 112 to the stepped down end section of the axle shaft 112. The bearings 148 and 150 may be adapted to roll back and forth within the shaft cavity 120 between the forward and rear side walls 122 and 124, and may be contained by upper and lower surfaces of the shaft cavity 120 as seen for example in FIG. 13.

Third Embodiment

Another specific embodiment of a pedal 160 is shown in FIGS. 21-23. The structure and operation of pedal 160 is the same as described above for pedal 98 in connection with FIGS. 11-20, except as described below. The pedal 160 includes a pedal body member 162 having a shaft cavity 164. The pedal body member 162 may include an upper pedal body member and a lower pedal body member 163 like the second embodiment discussed above. The lower pedal body member 163 is shown in FIG. 23. In a specific embodiment, the shaft cavity 164 may include a forward recess 166 and a rear recess 168. A forward leaf spring 170 may be secured in the forward recess 166. A rear leaf spring 172 may be secured in the rear recess 168. Each of the forward and rear leaf springs 170 and 172 are adapted for engagement with a collar 174 disposed around the axle shaft 112. Note that the collar 174 is a one-piece collar as opposed to the two-piece collar 138 discussed above in connection with the second embodiment. The collar 174 may include a forward cylindrical stud 176 and a rear cylindrical stud 178. The forward leaf spring 170 is adapted for engagement with the forward cylindrical stud 176, and the rear leaf spring 172 is adapted for engagement with the rear cylindrical stud 178. The springs 170 and 172 provide a self-centering feature and function together to hold the pedal body member 162 in a home position as shown in FIG. 21 when no forces are being applied (such as by a cyclist's foot) to rotate the pedal body member 162 relative to the axle shaft 112. The other aspects of the pedal 160 function the same way as described above with respect to the pedal 98 in the second embodiment.

Fourth Embodiment

Figure 24:
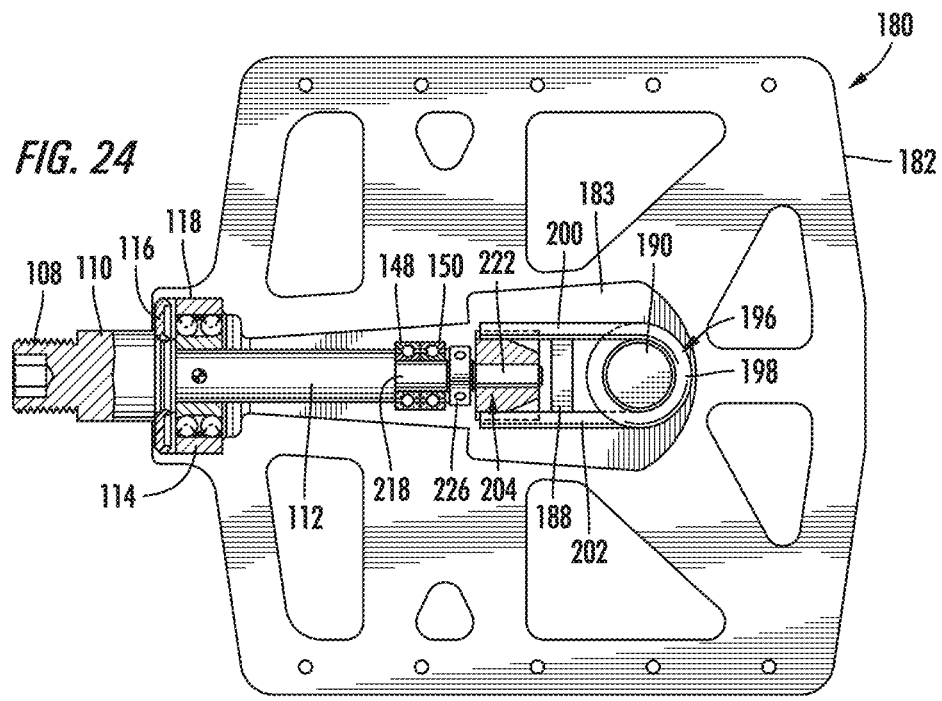
FIG. 24 is a top view of another specific embodiment of a pedal constructed in accordance with another aspect of the present inventions.
Figure 25:
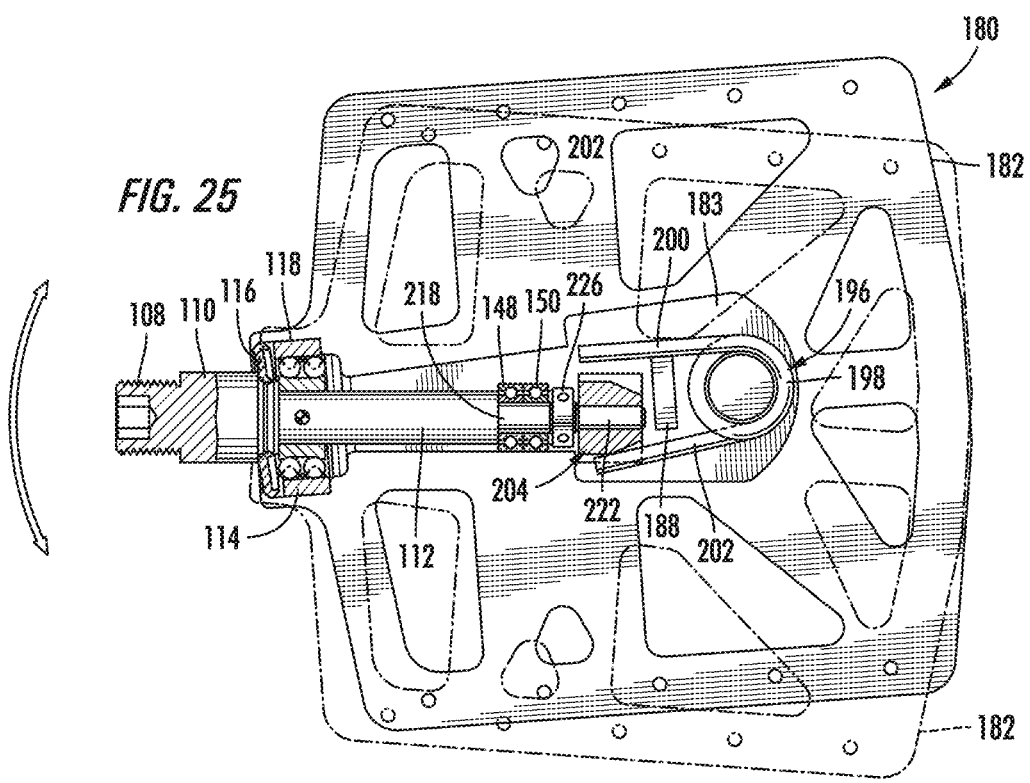
FIG. 25 is a top view of the pedal shown in FIG. 24 with an outline of a pedal body member in dashed lines and rotated relative to an axle.
Figure 26:
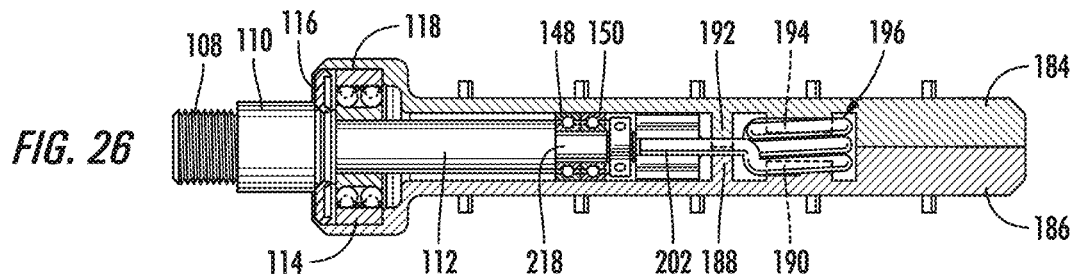
FIG. 26 is a front cross-sectional view of the pedal shown in FIG. 25.
Figure 29:
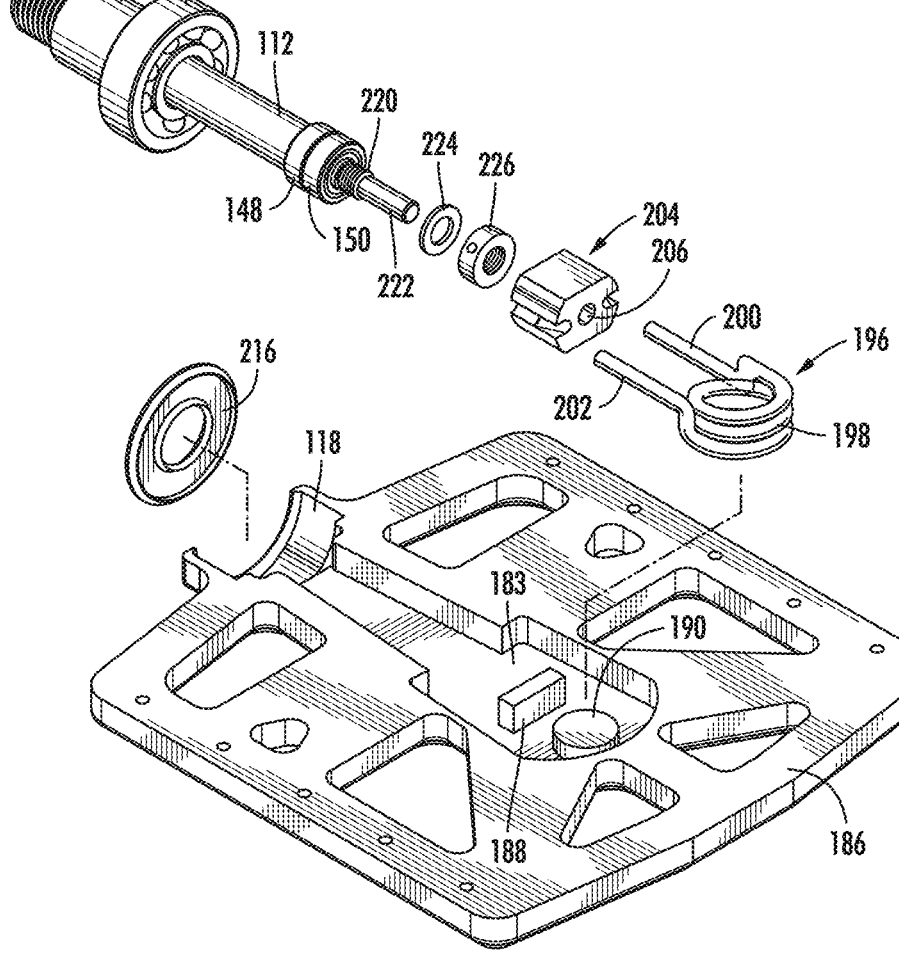
FIG. 29 is an exploded view of the pedal shown in FIGS. 24-28.
Figure 30:
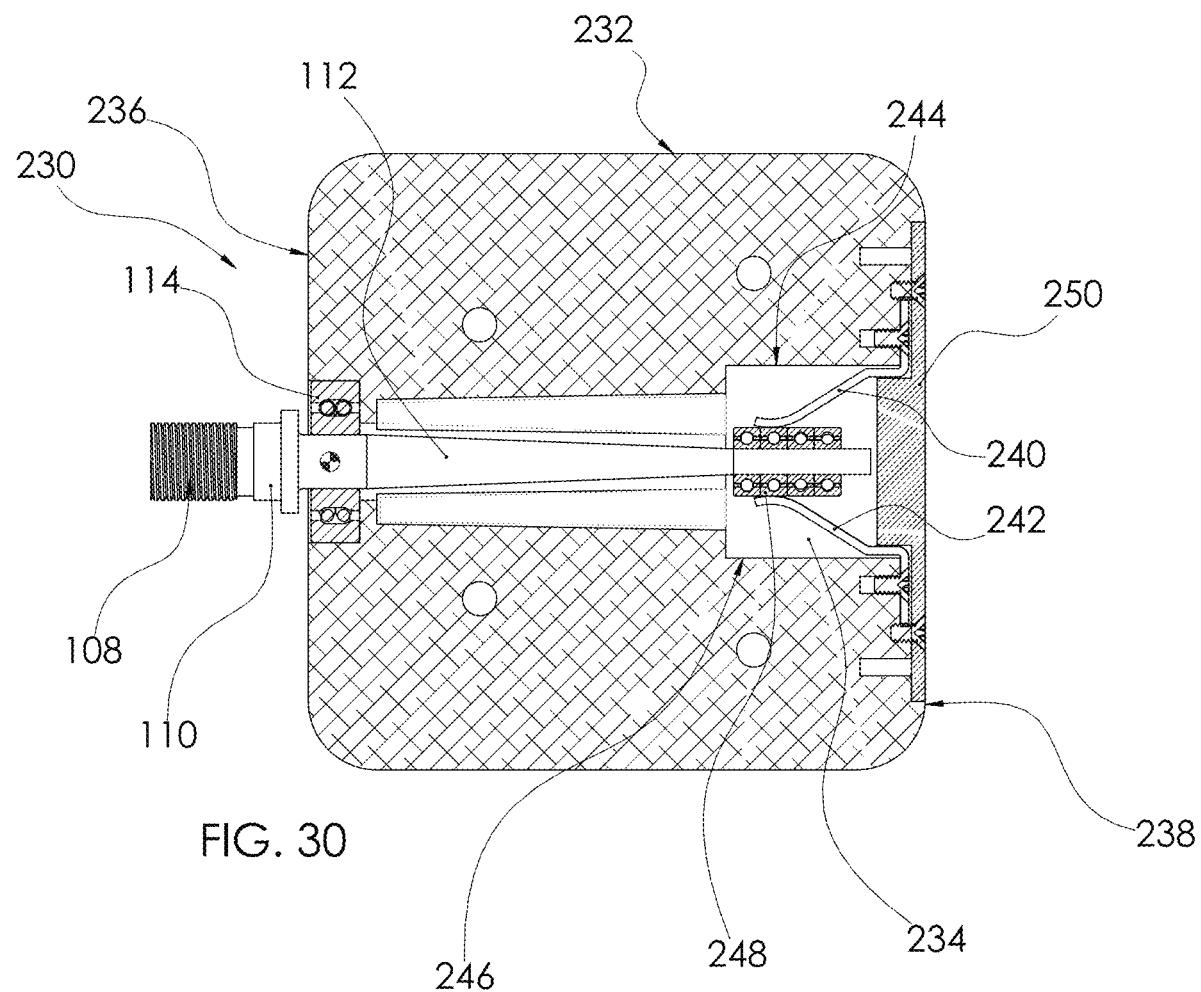
FIG. 30 is a top view of another specific embodiment of a pedal constructed in accordance with another aspect of the present inventions.
Figure 31:
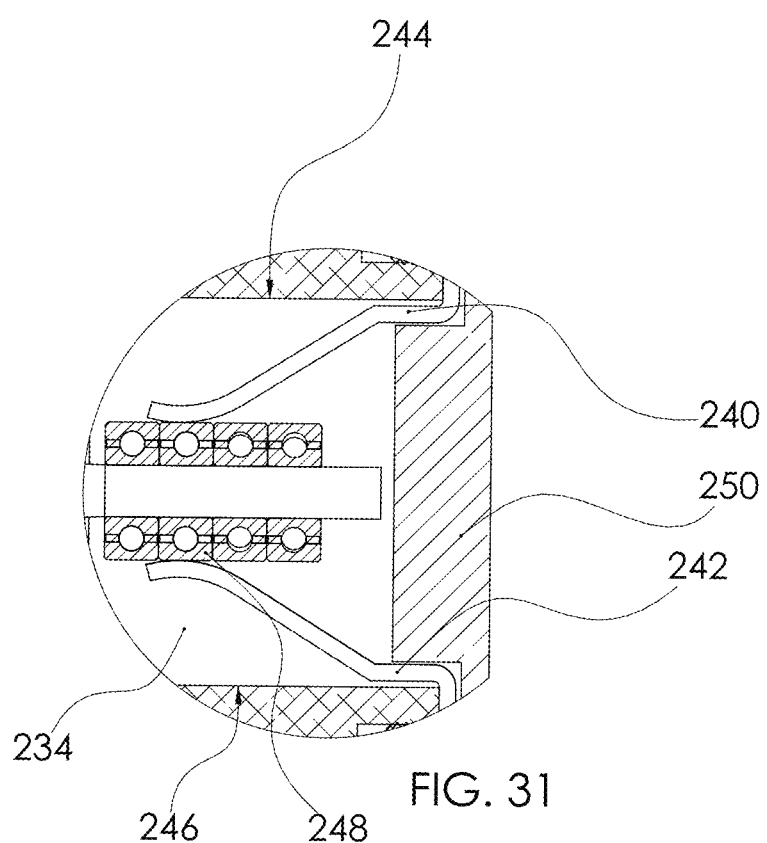
FIG. 31 is an enlarged view of a portion of the pedal shown in FIG. 30.
Figure 32:
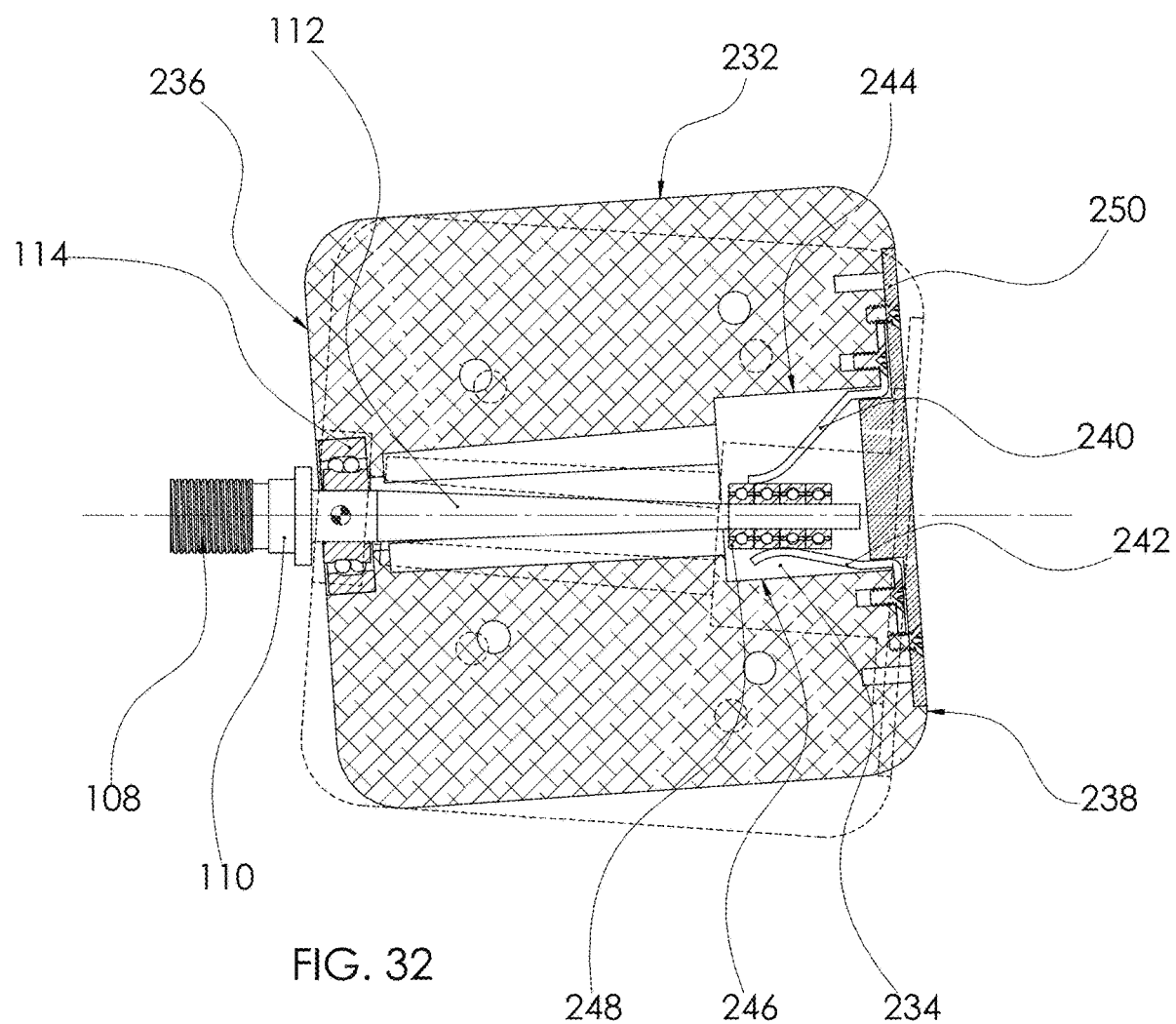
FIG. 32 is a top view of the pedal shown in FIG. 30 with an outline of a pedal body member in dashed lines and rotated relative to an axle.
Figure 33:
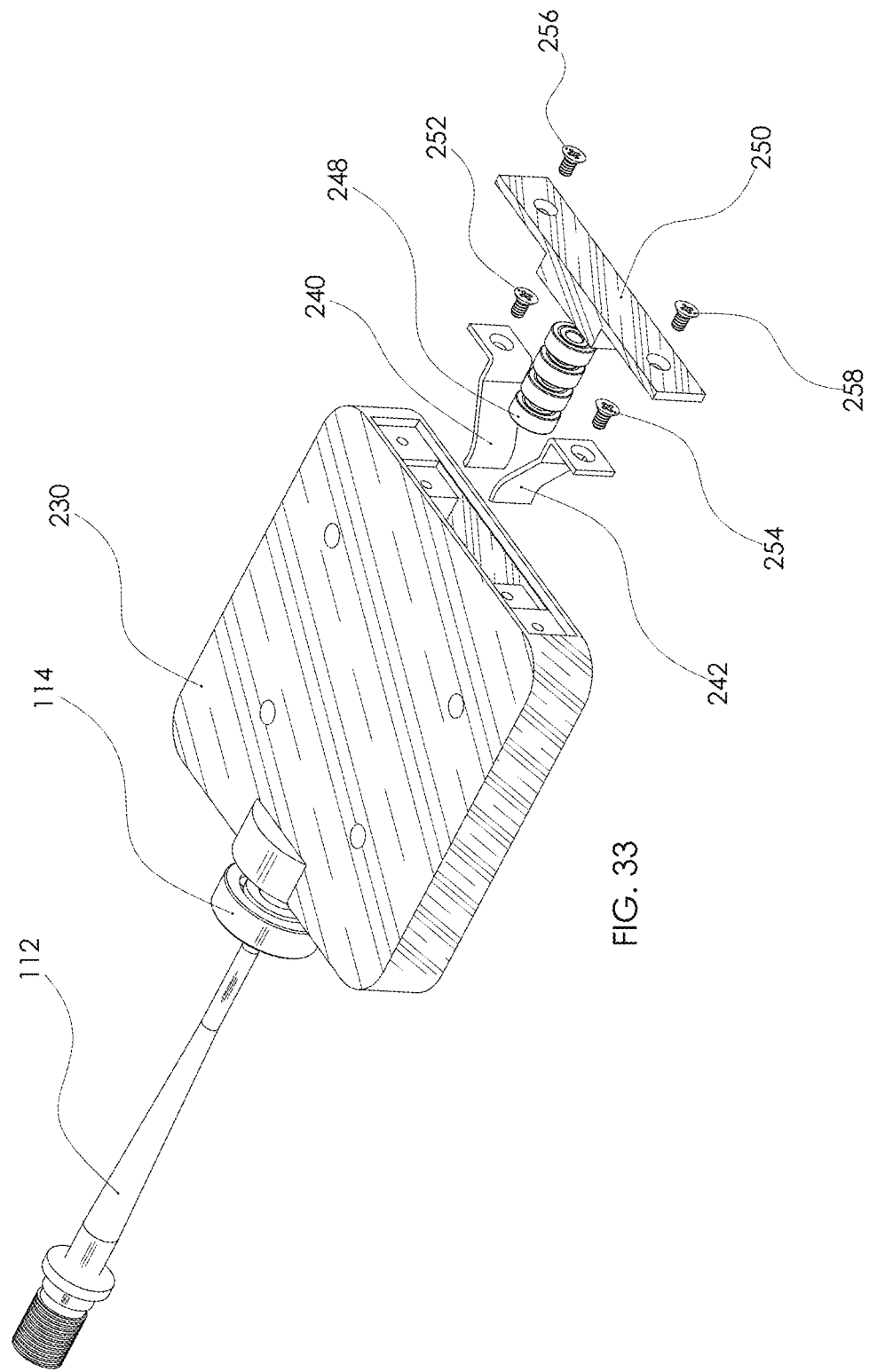
FIG. 33 is an exploded perspective view of the pedal shown in FIGS. 30-32.
Figure 34:
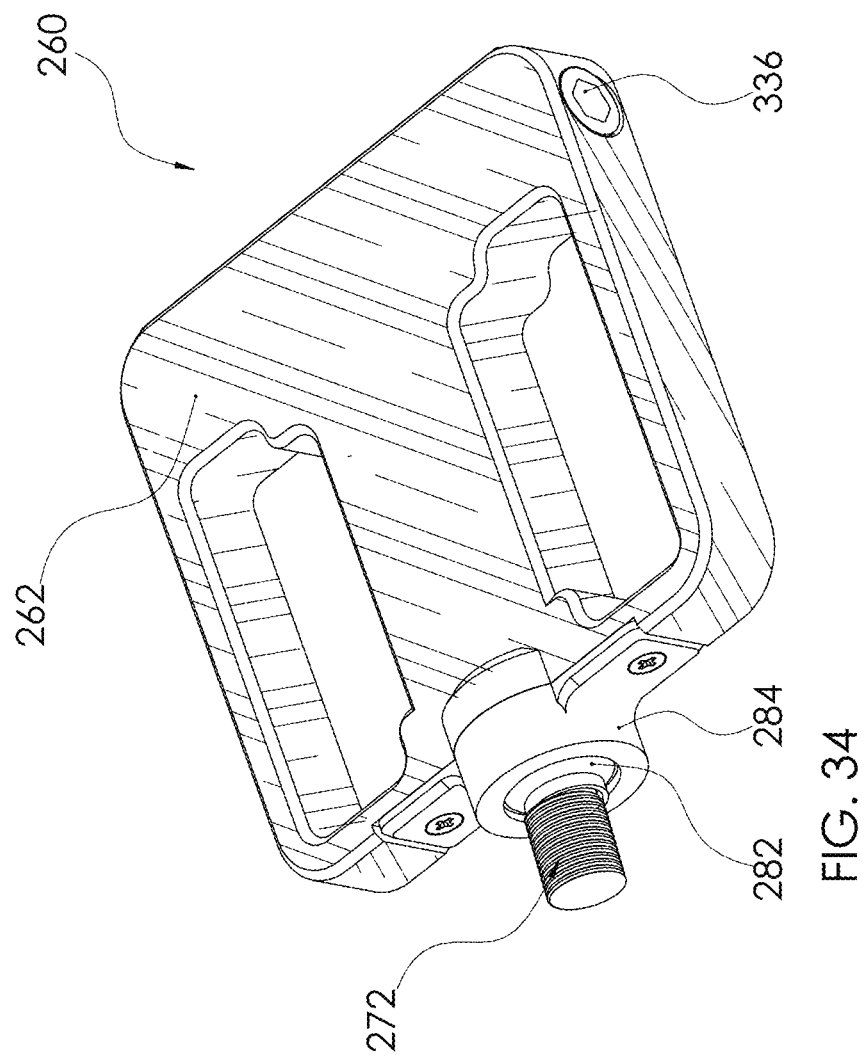
FIG. 34 is a perspective view of another specific embodiment of a pedal constructed in accordance with the present inventions.
Figure 35:
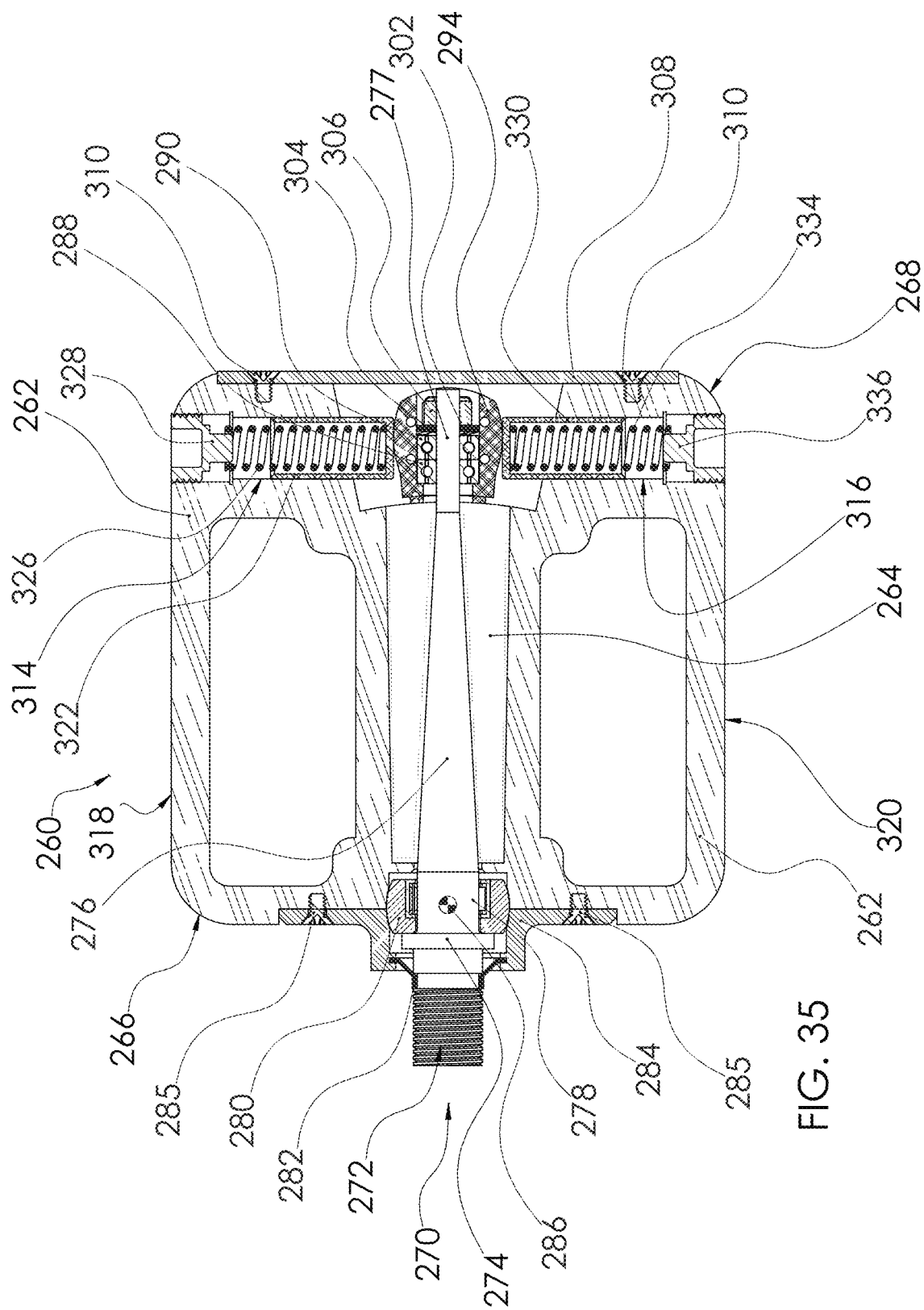
FIG. 35 is a top view the pedal shown in FIG. 34.
Figure 36:
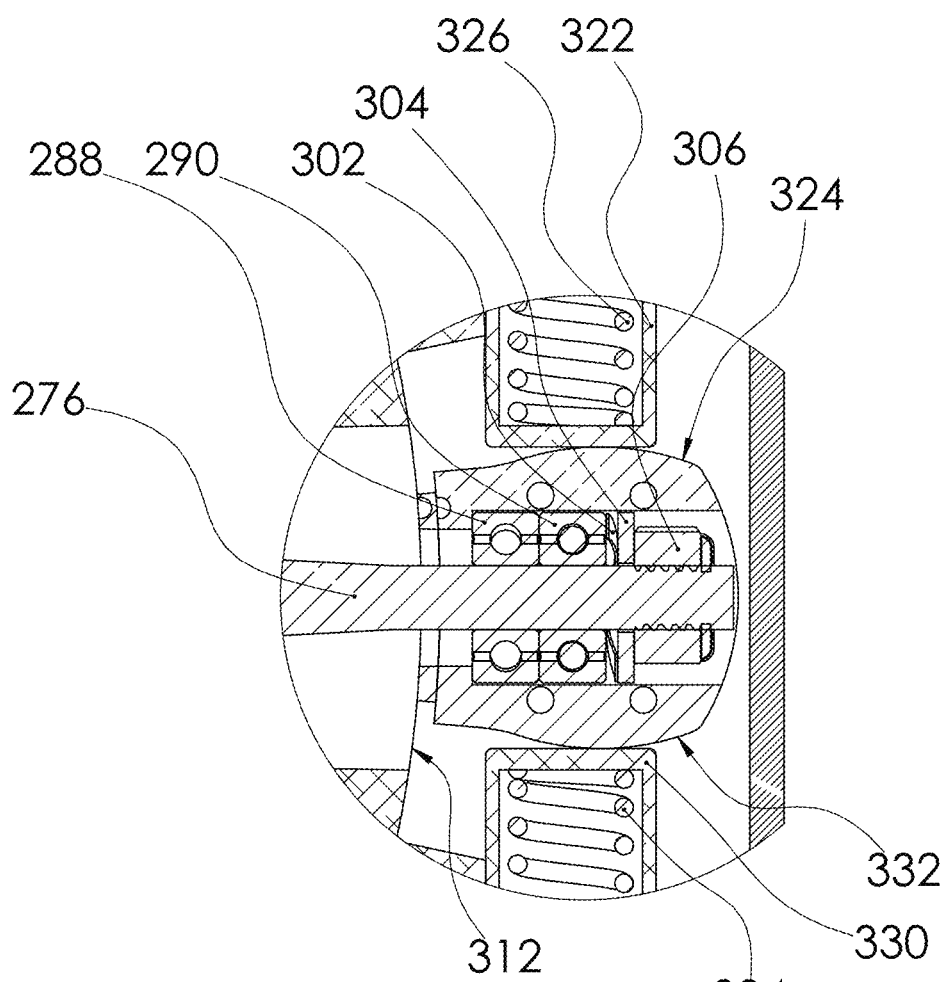
FIG. 36 is an enlarged view of a portion of the pedal shown in FIG. 35.

Another specific embodiment of a pedal 180 is shown in FIGS. 24-29. The structure and operation of the pedal 180 is the same as described above for pedals 98 and 160 in connection with FIGS. 11-23, except as described below. The pedal 180 includes a pedal body member 182 having a shaft cavity 183. In a specific embodiment, the pedal body member 182 may include an upper pedal body member 184 and a lower pedal body member 186 like the second and third embodiments discussed above. In various specific embodiments of the present inventions, the pedal body members may be of a one-piece construction. In a specific embodiment, a distal end of the shaft cavity 183 may include a lower support block 188 and a lower anchor stud 190, each of which may be formed as part of the lower pedal body member 186, as best seen in FIG. 29. Similarly, the distal end of the shaft cavity 183 may include an upper support block 192 and an upper anchor stud 194, each of which may be formed as part of the upper pedal body member 184, as shown in FIG. 26.

The pedal 180 may also include a self-centering torsion spring 196 having a main body 198, a forward arm 200 extending from one side of the main body 198, and a rear arm 202 extending from the other side of the main body 198. The main body 198 of the torsion spring 196 is placed over and held in place by the lower anchor stud 190 and the upper anchor stud 194, as shown for example in FIG. 26. The rear arm 202 of the torsion spring 196 is disposed adjacent rear edges of the lower support block 188 and the upper support block 192. The forward arm 200 of the torsion spring 196 is disposed adjacent forward edges of the lower support block 188 and the upper support block 192. The forward arm 200 and the rear arm 202 of the torsion spring 196 are engaged with a spring block 204 that is attached to the distal end of the axle shaft 112, as further discussed below.

Figures 27, 28:
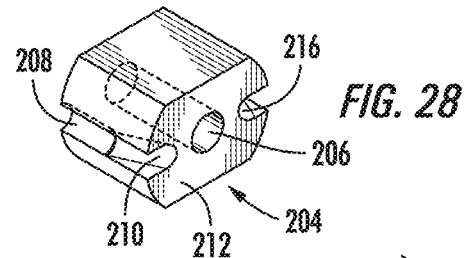
FIG. 27 is a perspective view of a support block that forms part of the pedal shown in FIGS. 24-26.
FIG. 28 is another perspective view of the support block shown in FIG. 27.

Referring now to FIGS. 27 and 28, the spring block 204 may include a longitudinal bore 206 therethrough for receiving the distal end of the axle shaft 112, as discussed in more detail below. The spring block 204 may also include a rear channel 208 on a rear side of the spring block 204. The rear channel 208 may include a rear inclined section 210 extending from a right face 212 of the spring block 204. The spring block may also include a forward channel 214 on a forward side of the spring block 204. The forward channel may include a forward inclined section 216 extending from the right face 212 of the spring block 204. In a specific embodiment, the forward and rear sides of the spring block 204 may be mirror images of each other.

Referring to FIG. 29, it can be seen that the structure of the axle shaft 112 is different than in the second and third embodiments. In this specific embodiment, the axle shaft 112 may include a first necked down section 218 (see, e.g., FIG. 26), an intermediate threaded section 220, and a second necked down section 222 at the distal end of the axle shaft 112. Bearings 148 and 150 are disposed around the first necked down section 218 of the axle shaft 112, and are held in place by a washer 224 and locking collar 226 that is adapted for threadable engagement with the intermediate threaded section 220 of the axle shaft 112. The second necked down section 222 of the axle shaft 112 is inserted in the longitudinal bore 206 of the spring block 204.

The pedal 180 is shown in a resting state in FIG. 24. In this resting state, the axle shaft 112 is centrally disposed within the shaft cavity 183. The forward arm 200 of the torsion spring 196 is resting against the forward edges of the support blocks 188 and 192, and is also disposed in the forward channel 214 of the spring block 204, but not in the forward inclined section 216 of the forward channel 214. Likewise, the rear arm 202 of the torsion spring 196 is resting against the rear edges of the support blocks 188 and 192, and is also disposed in the rear channel 208 of the spring block 204, but not in the rear inclined section 210 of the rear channel 208.

FIG. 25 illustrates the functioning of the torsion spring 196 when a cyclist's right foot causes counter-clockwise rotation of the pedal body member 182 relative to the axle shaft 112, which in turn moves the axle shaft 112 rearwardly within the shaft cavity 183. This causes the spring block 204 to push rearwardly against the rear arm 202 of the torsion spring 196, and deflect the rear arm 202 from its resting position into a flexed position in which the rear arm 202 will come into contact with the rear inclined section 210 of the rear channel 208 in the spring block 204.

Fifth Embodiment

Another specific embodiment of a pedal 230 is shown in FIGS. 30-33. The structure and operation of the pedal 230 may be the same as described above for pedals 98, 160 and 180 in connection with FIGS. 11-29, except as described below. The pedal 230 includes a pedal body member 232 having a shaft cavity 234. In a specific embodiment, the shaft cavity 234 may extend from a first side 236 of the pedal body member 230 to a second side 238 of the pedal body member 230. In a specific embodiment, the pedal 230 may include a forward cantilever spring 240 and a rear cantilever spring 242, which together may provide a self-centering function to the pedal 230. A fixed end of the forward cantilever spring 240 may be secured to the pedal body member 230, such as to a forward wall 244 of the shaft cavity 234 or to the second end 238 of the pedal body member 230 with a screw 252 (see FIG. 33), and a distal end of the forward cantilever spring 240 may be in contact with a forward edge(s) of one or more bearings 248 to apply a biasing force to the shaft 112. Similarly, a fixed end of the rear cantilever spring 242 may be secured to the pedal body member 230, such as to a rear wall 246 of the shaft cavity or to the second end 238 of the pedal body member 230 with a screw 254 (see FIG. 33), and a distal end of the rear cantilever spring 242 may be in contact with a rear edge(s) of the one or more bearings 248 to apply a biasing force to the shaft 112 in opposition to the biasing force from the forward cantilever spring 240. In a specific embodiment, the end of the shaft cavity 234 adjacent the second side 238 of the pedal body member 230 may be enclosed by an end cap 250 that may be secured to the second side 238 of the pedal body member 230, such as with screws 256 and 258.

Sixth Embodiment

Another specific embodiment of a pedal 260 is shown in FIGS. 34-43. The pedal 260 includes a pedal body member 262 having a shaft cavity 264. In a specific embodiment, the shaft cavity 264 may extend from a first side 266 of the pedal body member 260 to a second side 268 of the pedal body member 260. The pedal 260 also includes an axle 270 having a threaded end 272, a hub 274, and a shaft 276. The pedal axle 270 is adapted for threadable engagement with a bicycle crank (not shown). A shaft bearing 278 (such as a needle bearing) is mounted around the pedal shaft 276 adjacent the hub 274 of the pedal axle 270. The shaft bearing 278 is mounted within a spherical bearing mount 280. In a specific embodiment, the spherical bearing mount 280 may be made from hard brass. The spherical bearing mount 280 is at least partially mounted within a machined pocket in the pedal body member 262 adjacent the first side 266 of the pedal body member 262, which may function as a machined "race" to constrain the spherical bearing mount 280. This allows for pivoting of the axle 270 while keeping the bearing in line with the shaft 276. A pedal shaft seal 282 may be positioned around the pedal shaft 276 adjacent the bearing mount 280. A pedal shaft bearing cover 284 may include a recess that may house the pedal shaft seal 282 and partially house the spherical bearing mount 280. The pedal shaft bearing cover 284 may be secured to the first side 266 of the pedal body member 262 (such as with screws 285) to secure the spherical bearing mount 280 to the pedal body member 262. In this manner, the axle 270 is rotatably mounted to the pedal body member 262. The spherical bearing mount 280 is disposed for pivotal movement about a central pivot axis 286, to allow the axle shaft 276 to move laterally within the shaft cavity 264.

A first distal bearing 288 and a second distal bearing 290 are rotatably mounted to a distal end 277 of the axle shaft 276. The first and second distal bearings 288 and 290 are disposed within a bearing pocket or bore 292 of a sliding bearing block 294, which is secured to the distal end 277 of the axle shaft 276. The sliding bearing block 294 may include an upper sliding surface 296 and a lower sliding surface 298 (each of which may be made from a low friction material) that may be in sliding contact with upper and lower surfaces of the shaft cavity 264, respectively (see lower sliding surface 299 on the pedal body member 262 in FIG. 43). In a specific embodiment, each of the upper and lower sliding surfaces 296 and 298 may be formed from or comprise an acetal resin sheet, such as DELRIN® Acetal Resin Sheet available from McMaster-Carr at www.mcmaster.com. The first and second distal bearings 288 and 290 are secured around the shaft 276 and against a rear annular wall 300 of the bearing pocket 292 in the bearing block 294 by a wave washer 302, washer 304, and nut 306. The left end of the bearing block 294 is secured against a bearing wall surface 312 in the shaft cavity 264. The bearing wall surface 312 may be curved or arcuate in shape. The end of the shaft cavity 264 may be covered with an end cover 308 attached by screws 310.

The pedal body member 262 includes a forward transverse bore 314 and a rear transverse bore 316. The forward transverse bore 314 extends from a forward edge 318 of the pedal body member 262 to the shaft cavity 264, and may be in generally perpendicular relationship to a longitudinal axis of the shaft 276 when in its resting position. The rear transverse bore 316 extends from a rear edge 320 of the pedal body member 262 to the shaft cavity 264, and may be in generally perpendicular relationship to the longitudinal axis of the shaft 276 when in its resting position.

A forward sleeve 322 is disposed for longitudinal movement within the forward transverse bore 314. The forward sleeve 322 includes an enclosed end disposed for contact with a forward surface 324 of the sliding bearing block 294. The forward surface 324 of the sliding bearing block 294 may be a concave surface or provided with a cam profile. The opposite end of the forward sleeve 322 is open and adapted to receive a forward spring 326. The forward spring 326 is held in a compressed state within the forward sleeve 322 by an adjustable forward spring cap 328 that is threadably engaged with the forward transverse bore 314 adjacent the forward edge 318 of the pedal body member 262. The adjustable forward spring cap 328 may include a nub seat adapted to fit within and constrain the forward spring 326. The adjustable forward spring cap 328 may be rotated in and out to adjust tension in the forward spring 326.

A rear sleeve 330 is disposed for longitudinal movement within the rear transverse bore 316. The rear sleeve 330 includes an enclosed end disposed for contact with a rear surface 332 of the sliding bearing block 294. The rear surface 332 of the sliding bearing block 294 may be a concave surface or provided with a cam profile. The opposite end of the rear sleeve 330 is open and adapted to receive a rear spring 334. The rear spring 334 is held in a compressed state within the rear sleeve 330 by an adjustable rear spring cap 336 that is threadably engaged with the rear transverse bore 316 adjacent the rear edge 320 of the pedal body member 262. The adjustable rear spring cap 336 may include a nub seat adapted to fit within and constrain the rear spring 334. The adjustable rear spring cap 336 may be rotated in and out to adjust tension in the rear spring 334.

Figure 37:
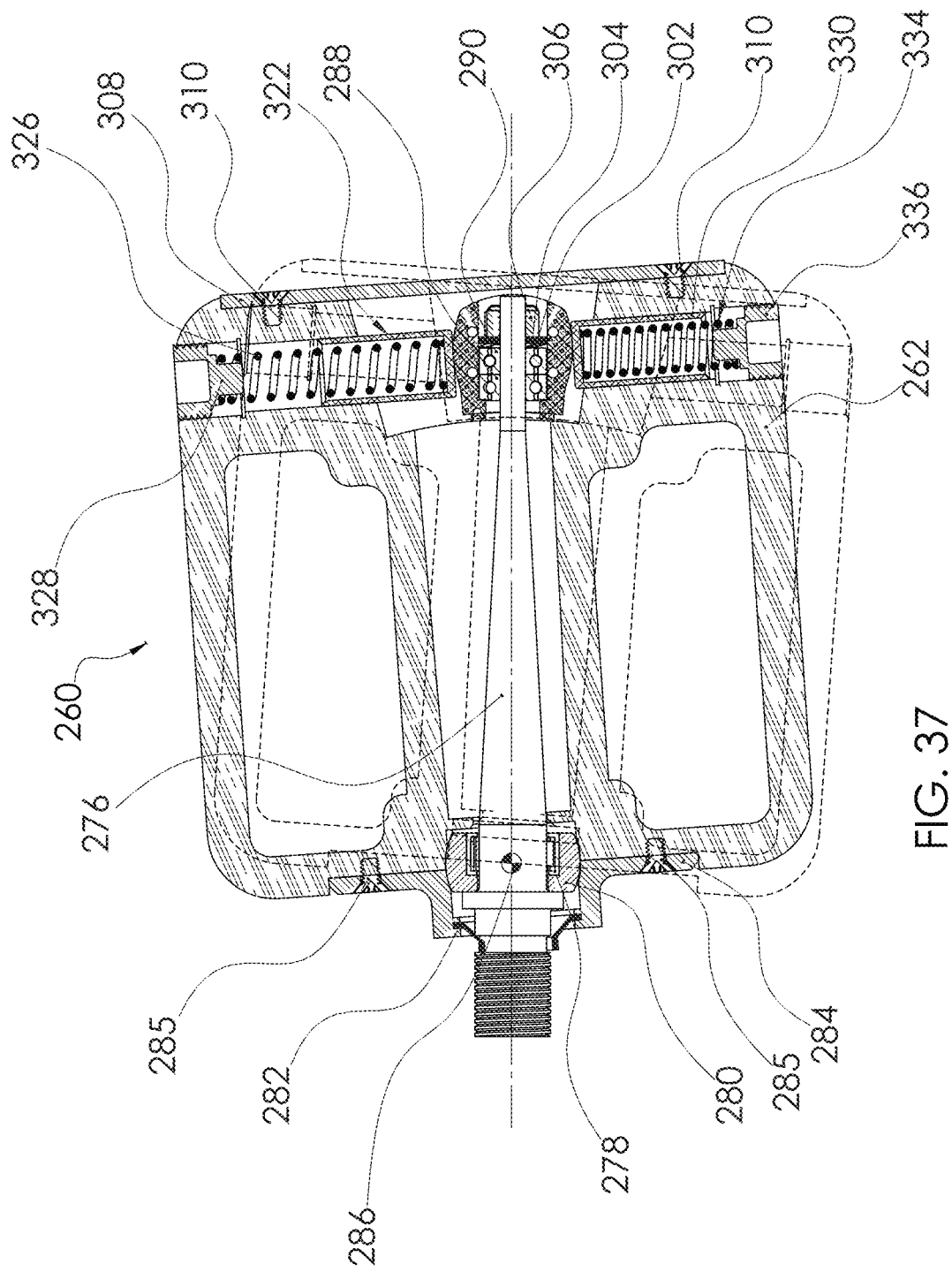
FIG. 37 is a top view of the pedal shown in FIG. 35 with an outline of a pedal body member in dashed lines and rotated relative to an axle.
Figure 38:
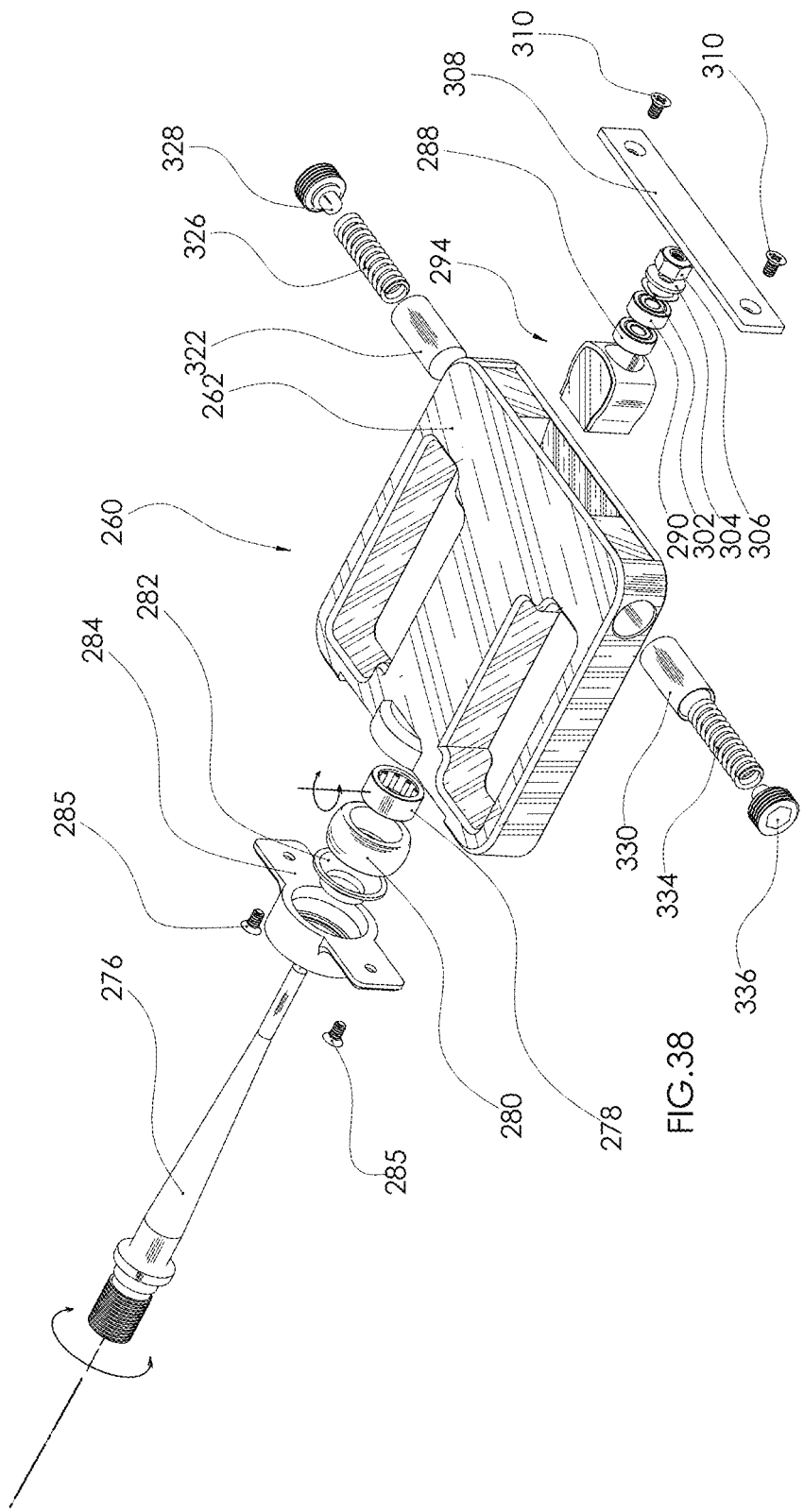
FIG. 38 is an exploded perspective view of the pedal shown in FIGS. 34-37.
Figure 42:
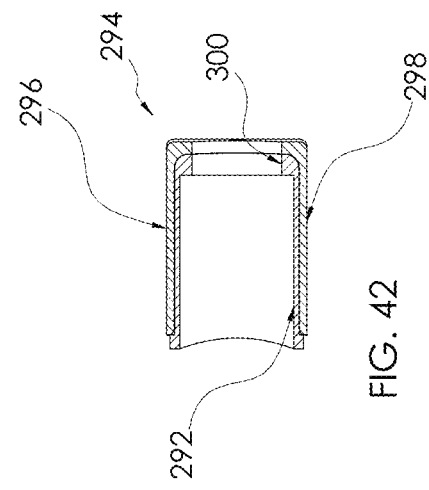
FIG. 42 is a cross-sectional view taken along line 42-42 in FIG. 41.
Figure 40:
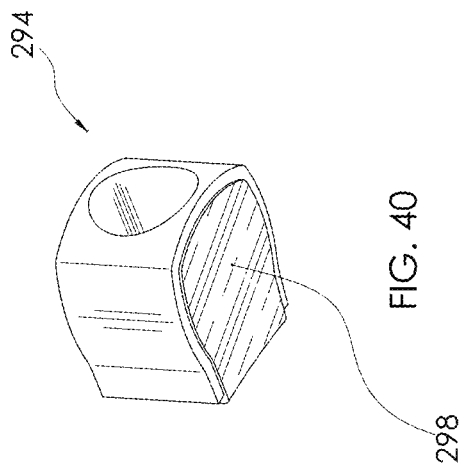
FIG. 40 is another perspective view of the sliding bearing block shown in FIG. 39.
Figure 39:
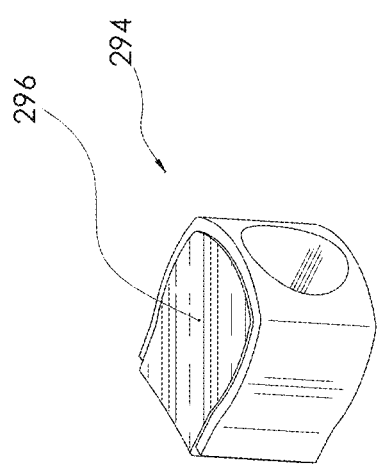
FIG. 39 is a perspective view of a sliding bearing block that forms part of the pedal shown in FIGS. 34-38.
Figure 41:
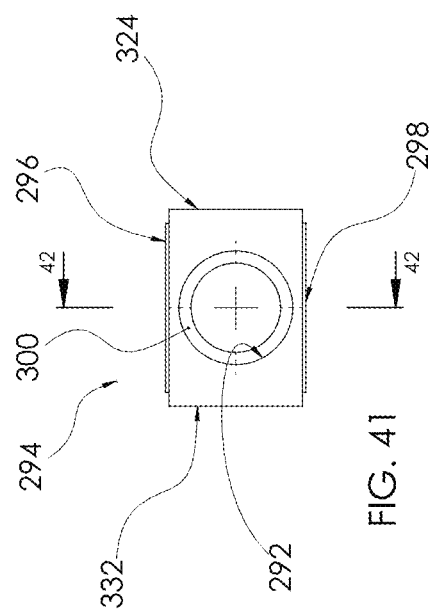
FIG. 41 is an end view from the right side of the sliding bearing block shown in FIGS. 39 and 40.
Figure 43:
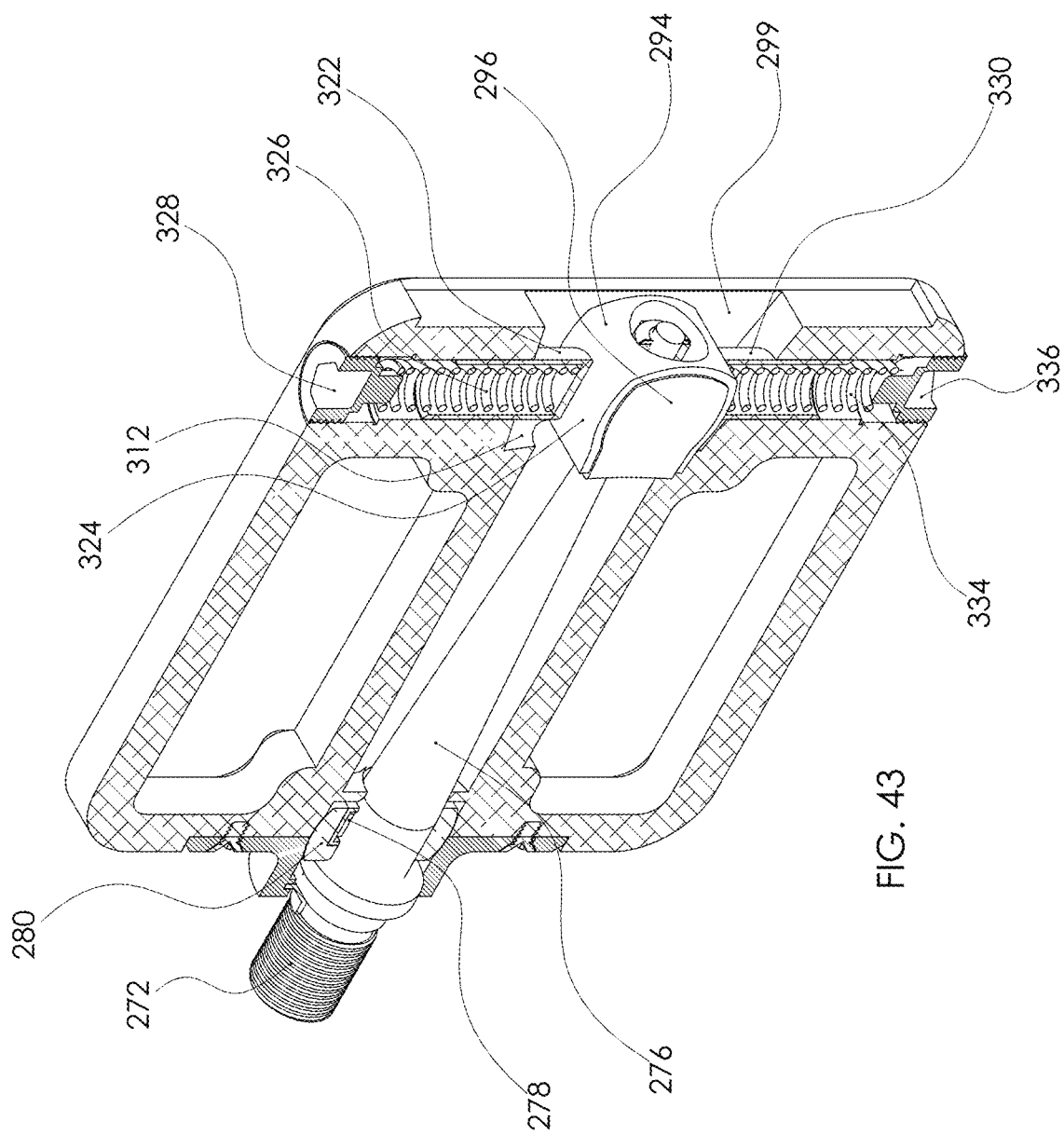
FIG. 43 is a perspective view in partial cross-section of the pedal shown in FIGS. 34-39.
Figure 44:
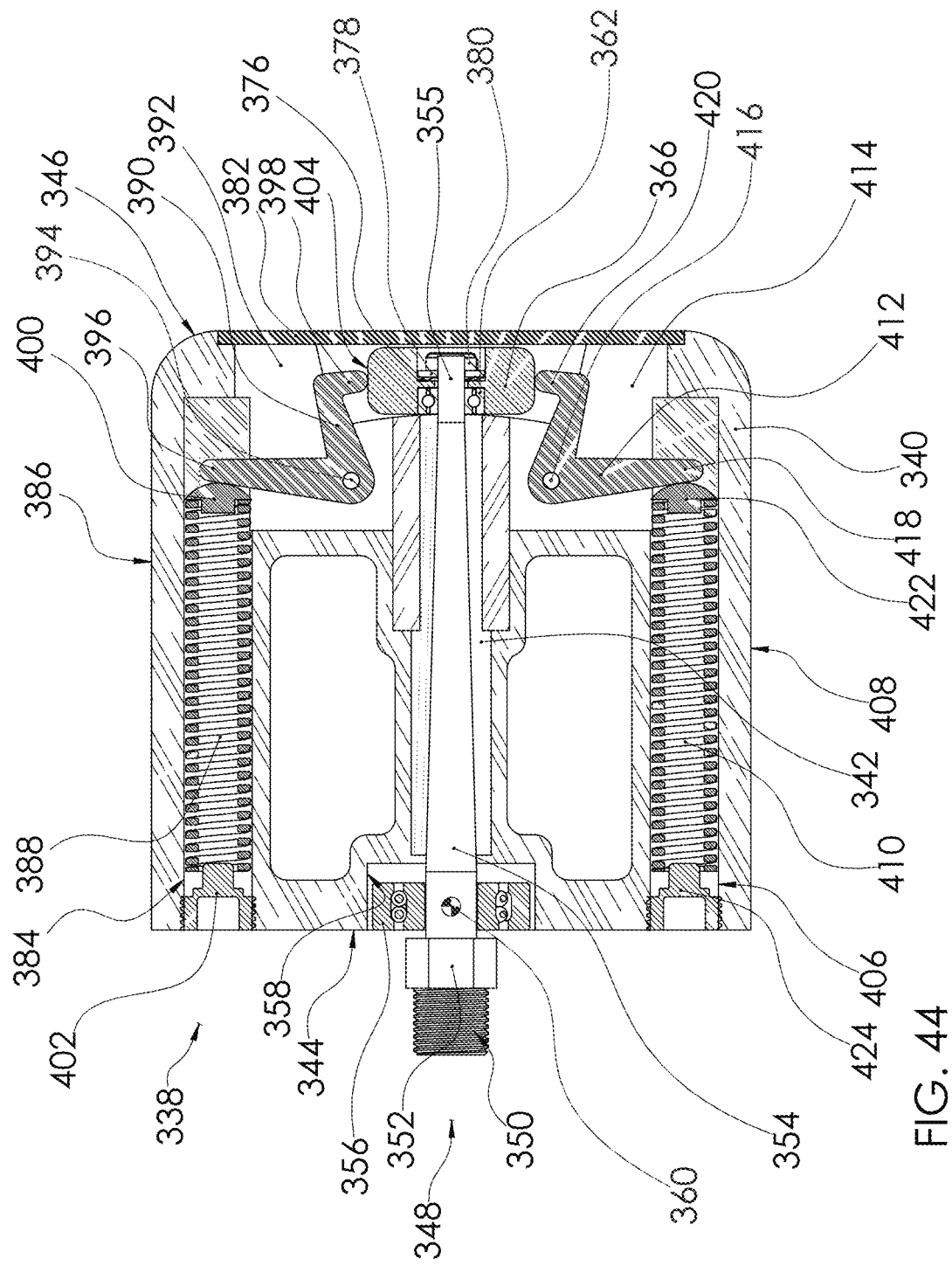
FIG. 44 is a top view of another specific embodiment of a pedal constructed in accordance with another aspect of the present inventions.
Figure 45:
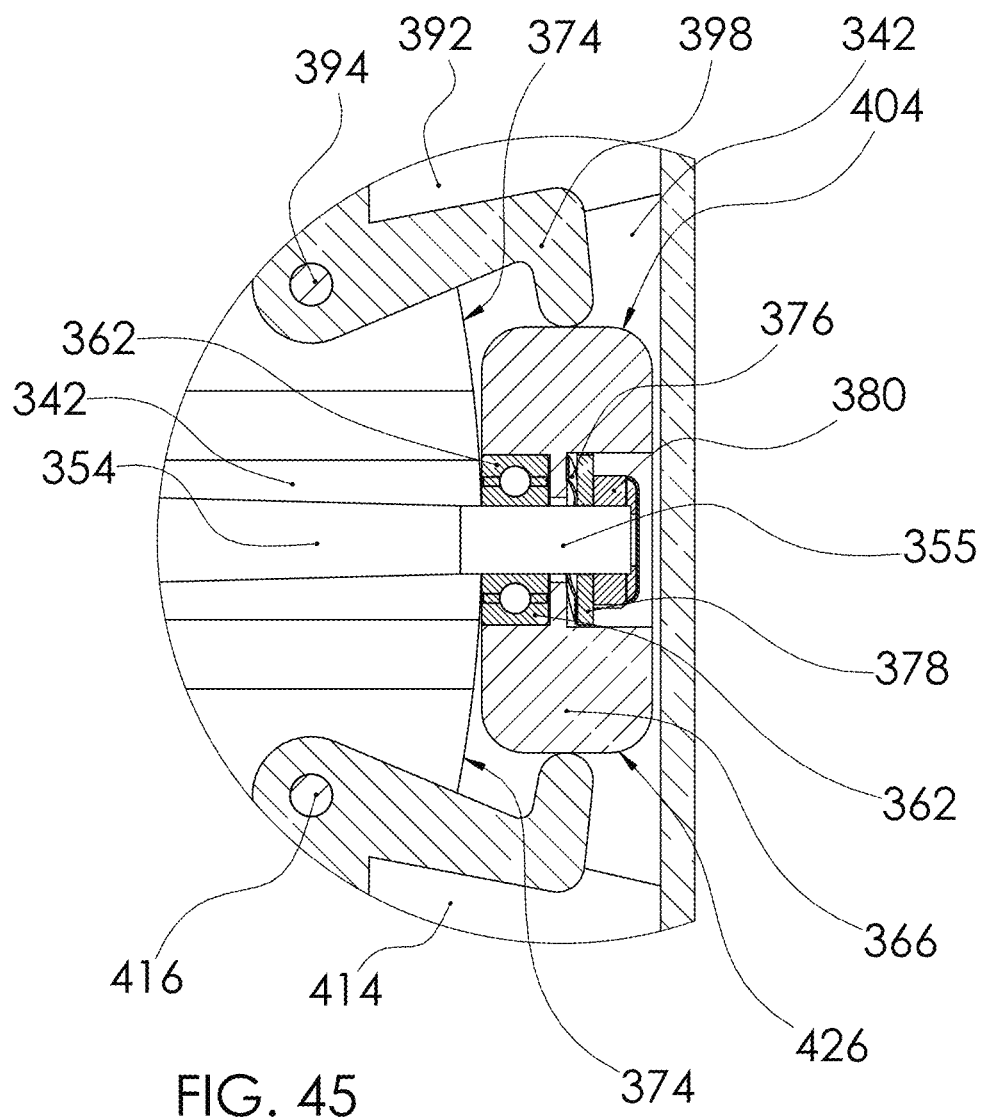
FIG. 45 is an enlarged view of a portion of the pedal shown in FIG. 44.

In operation, the forward and rear springs 326 and 334 function to apply force against the sliding bearing block 294 to hold the pedal body member 262 in a home position relative to the axle shaft 276 and to urge the pedal body member 262 back to its home position after it has been rotated away from its home position, such as shown in FIG. 37. The sliding bearing block 294 may move laterally within the shaft cavity 264 and along the bearing wall surface 312 as the pedal body member 262 rotates relative to the shaft 276 about the central pivot axis 286.

Seventh Embodiment

Another specific embodiment of a pedal 338 is shown in FIGS. 44-52. The pedal 338 includes a pedal body member 340 having a shaft cavity 342. In a specific embodiment, the shaft cavity 342 may extend from a first side 344 of the pedal body member 340 to a second side 346 of the pedal body member 340. The pedal 338 also includes an axle 348 having a threaded end 350, a hub 352, and a shaft 354. The pedal axle 348 is adapted for threadable engagement with a bicycle crank (not shown). A self-aligning bearing 356 is mounted around the pedal shaft 354 adjacent the hub 352 of the pedal axle 348, and within a bearing recess 358. In this manner, the axle 348 is rotatably mounted to the pedal body member 340. The shaft 354 is disposed for pivotal movement about a central pivot axis 360, to allow the axle shaft 354 to move laterally within the shaft cavity 342.

A distal bearing 362 is rotatably mounted to a distal bearing surface 355 of the axle shaft 354. The distal bearing 362 is disposed within a bearing pocket or bore 364 of a sliding bearing block 366 (see FIGS. 48-51), which is secured to a distal end of the axle shaft 354. The sliding bearing block 366 may include an upper sliding surface 368 and a lower sliding surface 370 that may be in sliding contact with upper and lower surfaces of the shaft cavity 342. The upper and lower sliding surfaces 368 and 370 may be part of the sliding bearing block 366 or formed from added low friction material. In a specific embodiment, each of the upper and lower sliding surfaces 368 and 370 may be formed from or comprise an acetal resin sheet, such as White Delrin® Acetal Resin Sheet available from McMaster-Carr at www.mcmaster.com. The distal bearing 362 is secured around the shaft 354 and between an interior annular wall 372 within the sliding bearing block 366 and a bearing wall surface 374 in the shaft cavity 342. The sliding bearing block 366 is engaged against the bearing wall surface 374 (which may be a concave surface) by a wave washer 376, a washer 378 and a nut 380 that are pressed against a distal side of the interior annular wall 372 within the sliding bearing block 366. The end of the shaft cavity 342 may be covered with an end plate 382.

The pedal body member 340 may include a forward spring bore 384, which may have a longitudinal axis generally parallel to a longitudinal axis of the shaft 354 when the shaft 354 is in a resting position, and/or generally parallel to a forward edge 386 of the pedal body member 340. The forward spring bore 384 may extend from the first side 344 of the pedal body member 340 toward the second side 346 of the pedal body member 340. A forward spring 388 is disposed within the forward spring bore 384. A forward adjustable spring cap 402 may be threadably engaged with a left end of the forward spring bore 384 adjacent the first side 344 of the pedal body member 340. The forward adjustable spring cap 402 may include a nub seat adapted to fit within and constrain the forward spring 388. A forward bellcrank 390 is rotatably mounted within a forward bellcrank recess 392 within the pedal body member 340. The forward bellcrank 390 may be mounted on a forward bellcrank pivot pin 394, which may be secured to upper and lower portions of the pedal body member 340. In a specific embodiment, the forward bellcrank pivot pin 394 may be disposed in generally perpendicular relationship to upper and lower surfaces of the pedal body member 340. The forward bellcrank 390 may include a first end 396 and a second end 398. The first end 396 of the forward bellcrank 390 may be adapted for engagement with a distal end of the forward spring 388, such as via a forward spring follower cap 400 engaged with the distal end of the forward spring 388. The opposite or left end of the forward spring 388 is engaged with the forward adjustable spring cap 402, which may be rotated in or out to adjust tension in the forward spring 388. The second end 398 of the forward bellcrank 390 is engaged with a forward edge 404 of the sliding bearing block 366.

The pedal body member 340 may include a rear spring bore 406, which may have a longitudinal axis generally parallel to a longitudinal axis of the shaft 354 when the shaft 354 is in a resting position, and/or generally parallel to a rear edge 408 of the pedal body member 340. The rear spring bore 406 may extend from the first side 344 of the pedal body member 340 toward the second side 346 of the pedal body member 340. A rear spring 410 is disposed within the rear spring bore 406. A rear adjustable spring cap 424 may be threadably engaged with a left end of the rear spring bore 406 adjacent the first side 344 of the pedal body member 340. The rear adjustable spring cap 424 may include a nub seat adapted to fit within and constrain the rear spring 410. A rear bellcrank 412 is rotatably mounted within a rear bellcrank recess 414 within the pedal body member 340. The rear bellcrank 412 may be mounted on a rear bellcrank pivot pin 416, which may be secured to upper and lower portions of the pedal body member 340. In a specific embodiment, the rear bellcrank pivot pin 416 may be disposed in generally perpendicular relationship to upper and lower surfaces of the pedal body member 340. The rear bellcrank 412 may include a first end 418 and a second end 420. The first end 418 of the rear bellcrank 412 may be adapted for engagement with a distal end of the rear spring 410, such as via a rear spring follower cap 422 engaged with the distal end of the rear spring 410. The opposite or left end of the rear spring 410 is engaged with the rear adjustable spring cap 424, which may be rotated in or out to adjust tension in the rear spring 410. The second end 420 of the rear bellcrank 412 is engaged with a rear edge 426 of the sliding bearing block 366.

Figure 46:
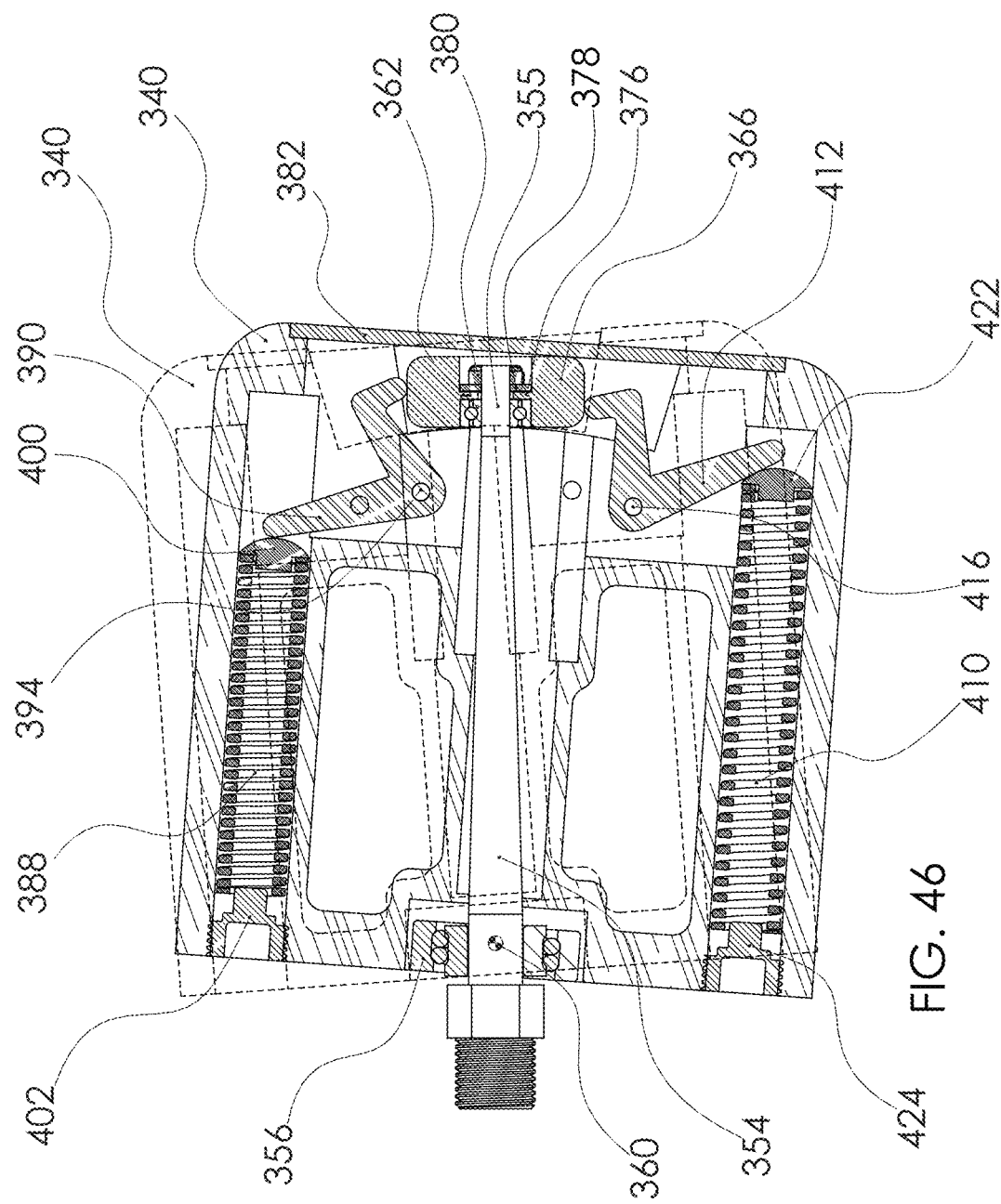
FIG. 46 is a top view of the pedal shown in FIG. 44 with an outline of a pedal body member in dashed lines and rotated relative to an axle.
Figure 47:
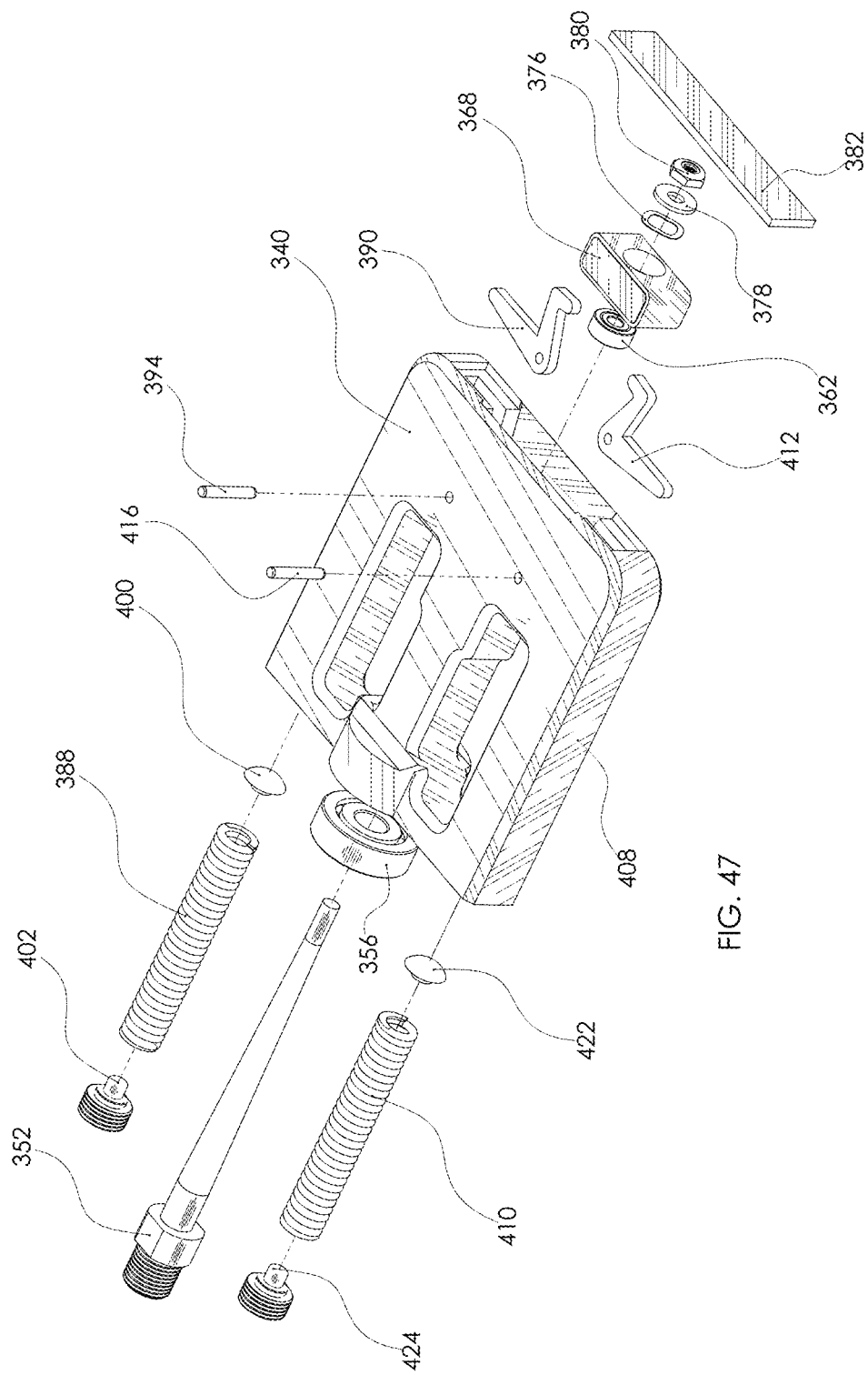
FIG. 47 is an exploded perspective view of the pedal shown in FIGS. 44-46.
Figure 49:
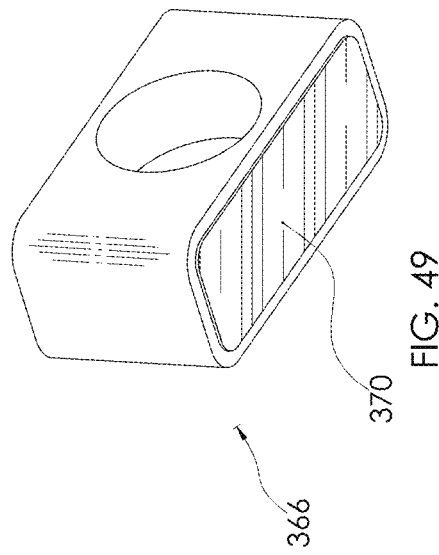
FIG. 49 is another perspective view of the sliding bearing block shown in FIG. 48.
Figure 51:
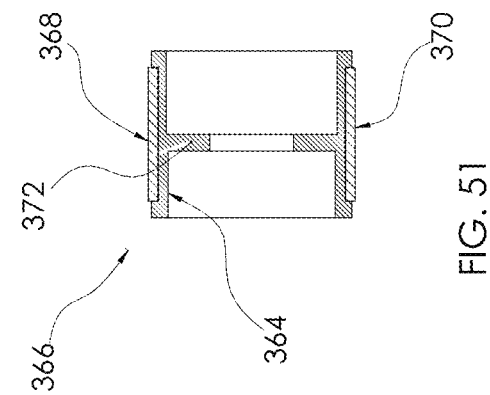
FIG. 51 is a cross-sectional view taken along line 51-51 in FIG. 50.
Figure 48:
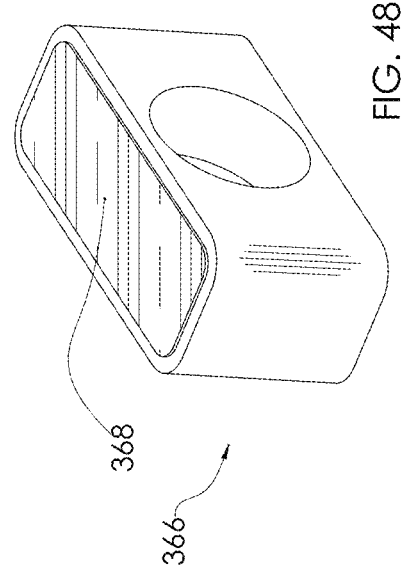
FIG. 48 is a perspective view of a sliding bearing block that forms part of the pedal shown in FIGS. 44-47.
Figure 50:
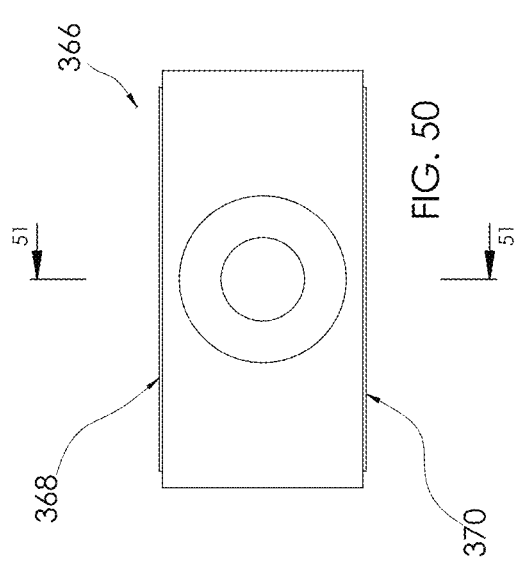
FIG. 50 is an end view of the sliding bearing block shown in FIGS. 48 and 49.
Figure 52:
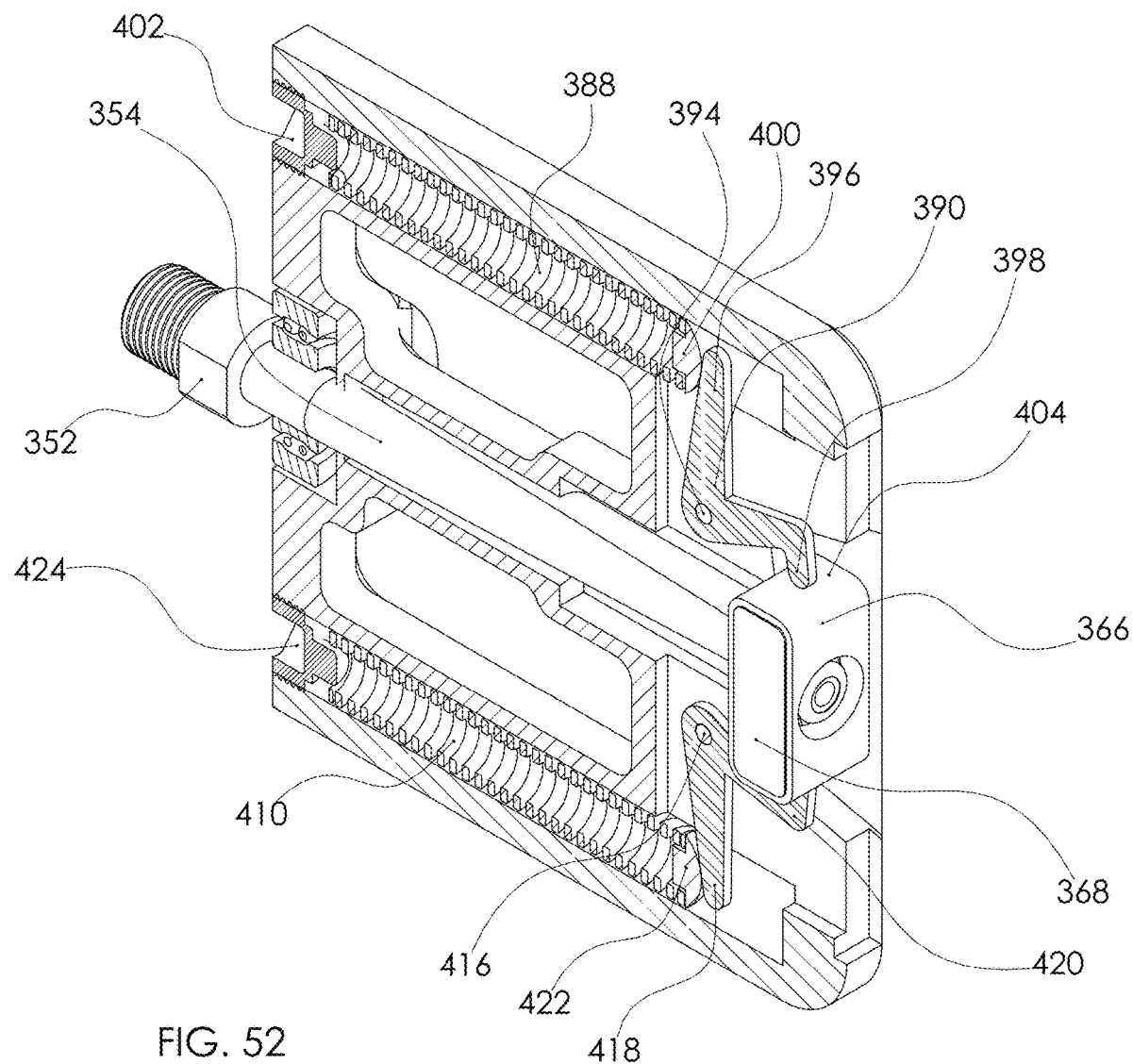
FIG. 52 is a perspective view in partial cross-section of the pedal shown in FIGS. 44-47.

In operation, the forward and rear springs 388 and 410 function to apply force against the sliding bearing block 366 via the forward and rear bellcranks 390 and 412 to hold the pedal body member 340 in a home position relative to the axle shaft 354 and to urge the pedal body member 340 back to its home position after it has been rotated away from its home position, such as shown in FIG. 46. The sliding bearing block 366 may move laterally within the shaft cavity 342 and along the bearing wall surface 374 as the pedal body member 340 rotates relative to the shaft 354 about the central pivot axis 360.

Figure 10:
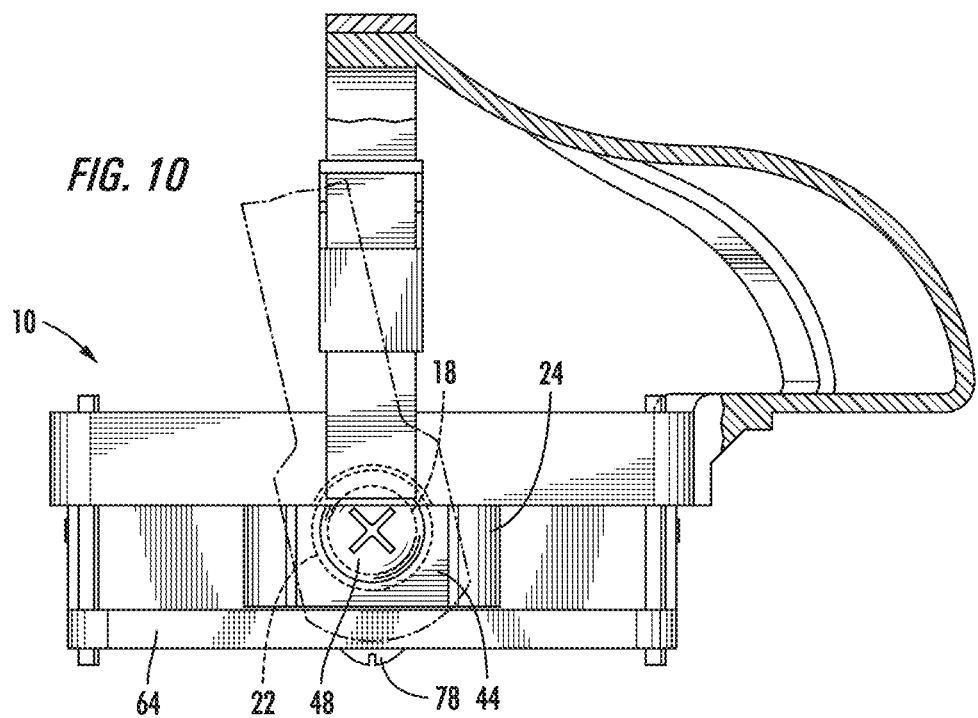
FIG. 10 is a right side view of the pedal as shown in FIGS. 1-9 and including a shoe strap.
Figure 10A:
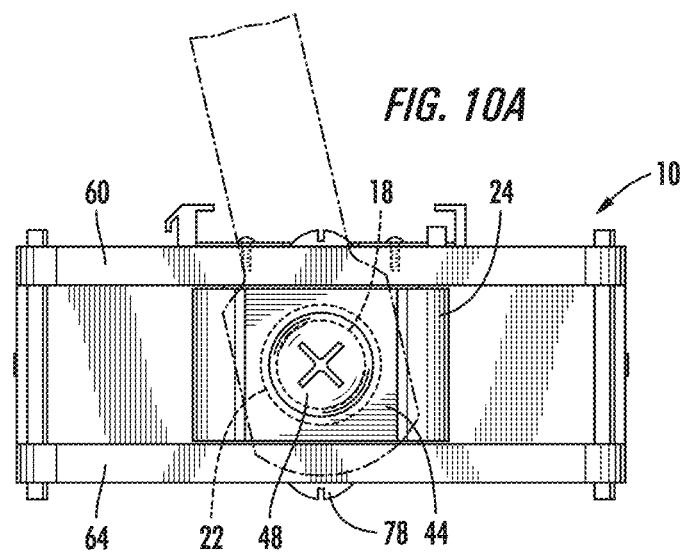
FIG. 10A is a right side view similar to FIG. 10 but shown a clipless shoe attachment instead of a shoe strap.
Figure 11:
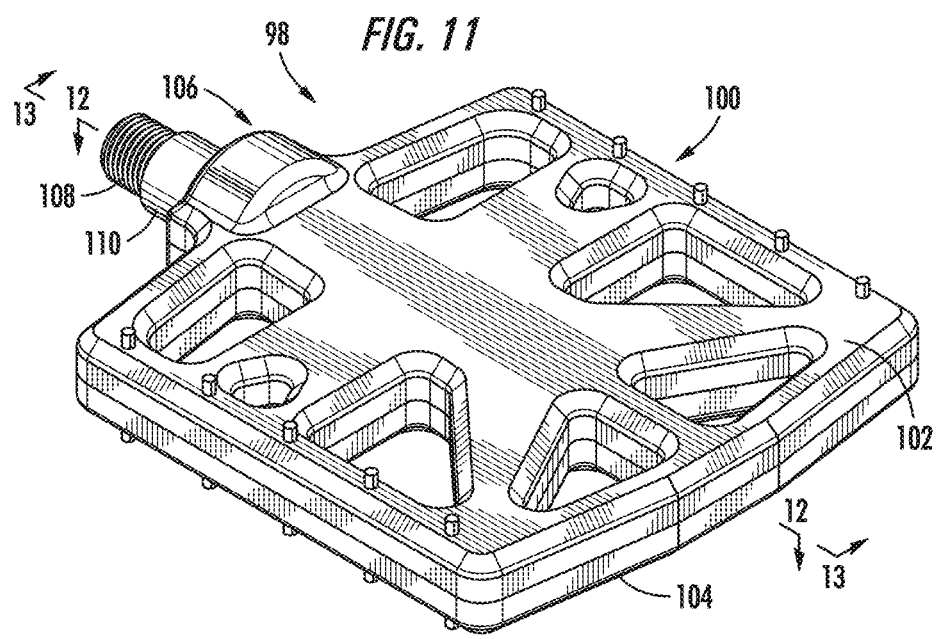
FIG. 11 is a perspective view of another specific embodiment of a pedal constructed in accordance with another aspect of the present inventions.

In a specific embodiment, the present inventions may cover a method of aligning the force exerted on a bicycle pedal or pedal equipment by the rider of a bicycle or equipment while maintaining anatomically correct alignment of the bicycle rider's foot, lower leg, and knee with the direction of the force applied to the pedal by the rider comprising the steps of: applying force to a bicycle pedal, the pedal comprising a tread for engagement by the shoe of the rider of the bicycle, a sleeve to which the pedal is mounted, and an elongated shaft, the sleeve rotating around the elongated shaft and pivoting the tread with respect to the elongated shaft, the axis of rotation of the sleeve around the elongated shaft being substantially orthogonal to the axis on which the tread is pivoted. The present inventions may also include the step of biasing the tread toward a neutral position/self-centering relative to the axis of rotation of the sleeve. The inventions may also include the step of adjusting the amount of bias applied to the tread to an optimal degree depending upon the anatomical alignment of the bicycle rider's foot, lower leg, and knee. As shown in FIGS. 10 and 10A, the inventions may also include a bicycle pedal that is adaptable for shoe engaging integral teeth, prongs, serrations, friction-modifying surface, clip, groove, basket, cage, or strap for strapping or clipping riders foot pedal.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. It should also be understood that various features and aspects of the various embodiments discussed above and illustrated in the Figures may be selectively incorporated with and/or removed from a specific embodiment to arrive at another specific embodiment. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A pedal comprising:
   a pedal body member having a shaft cavity, the shaft cavity having a forward side and a rear side;
   a shaft bearing mounted to the pedal body member adjacent to a left side of the pedal body member, the shaft bearing having a central pivot axis and being rotatable around the central pivot axis;
   an axle including a threaded end and a shaft, the shaft extending into the shaft cavity and being rotatably mounted to the shaft bearing adjacent a first location on the axle shaft, the axle shaft having a longitudinal axis perpendicular to the central pivot axis of the shaft bearing;

at least one distal bearing rotatably mounted to the axle shaft adjacent a second location on the axle shaft, the first location on the axle shaft being spaced apart from the second location on the axle shaft, the at least one distal bearing being located within the shaft cavity;

the pedal body member being rotatable relative to the axle shaft around the central pivot axis;

a sliding bearing block secured to a distal end of the axle shaft;

a forward spring supported by the pedal body member and positioned to impart a force to move the axle shaft toward the rear side of the shaft cavity; and a rear spring supported by the pedal body member and positioned to impart a force to move the axle shaft toward the forward side of the shaft cavity.

2. The pedal of claim 1, the forward spring being positioned to impart a force to a forward side of the sliding bearing block to move the sliding bearing block and axle shaft toward the rear side of the shaft cavity, and the rear spring being positioned to impart a force to move the sliding bearing block and axle shaft toward the forward side of the shaft cavity.

3. The pedal of claim 1, further including a forward sleeve enclosing a portion of the forward spring and having an enclosed end in contact with a forward cammed surface of the sliding bearing block, and a rear sleeve enclosing a portion of the rear spring and having an enclosed end in contact with a rear cammed surface of the sliding bearing block.

4. The pedal of claim 1, further including a spherical bearing mount secured to the pedal body member, and the shaft bearing is mounted within the spherical bearing mount.

5. The pedal of claim 4, wherein the spherical bearing mount is at least partially mounted within a machined pocket in the pedal body member.

6. The pedal of claim 4, wherein the spherical bearing mount is disposed for pivotal movement around the central pivot axis to allow the axle shaft to move laterally within the shaft cavity.

7. The pedal of claim 1, wherein the shaft bearing is a self-aligning bearing seated in an annular recess in the pedal body member.

8. A pedal comprising:
a pedal body member having a shaft cavity, the shaft cavity having a forward side and a rear side;
a shaft bearing mounted to the pedal body member adjacent to a left side of the pedal body member, the shaft bearing having a central pivot axis and being rotatable around the central pivot axis;
an axle including a threaded end and a shaft, the shaft extending into the shaft cavity and being rotatably mounted to the shaft bearing adjacent a first location on the axle shaft;
at least one distal bearing rotatably mounted to the axle shaft adjacent a second location on the axle shaft, the first location on the axle shaft being spaced apart from the second location on the axle shaft, the at least one distal bearing being located within the shaft cavity;
the pedal body member being rotatable in a first direction around a longitudinal axis of the axle shaft and in a second direction around the central pivot axis;
a sliding bearing block secured to a distal end of the axle shaft;
a forward spring supported by the pedal body member and positioned to impart a force to move the axle shaft toward the rear side of the shaft cavity; and
a rear spring supported by the pedal body member and positioned to impart a force to move the axle shaft toward the forward side of the shaft cavity.

9. The pedal of claim 8, the forward spring being positioned to impart a force to a forward side of the sliding bearing block to move the sliding bearing block and axle shaft toward the rear side of the shaft cavity, and the rear spring being positioned to impart a force to move the sliding bearing block and axle shaft toward the forward side of the shaft cavity.

10. The pedal of claim 8, further including a forward sleeve enclosing a portion of the forward spring and having an enclosed end in contact with a forward cammed surface of the sliding bearing block, and a rear sleeve enclosing a portion of the rear spring and having an enclosed end in contact with a rear cammed surface of the sliding bearing block.

11. The pedal of claim 8, further including a spherical bearing mount secured to the pedal body member, and the shaft bearing is mounted within the spherical bearing mount.

12. The pedal of claim 11, wherein the spherical bearing mount is at least partially mounted within a machined pocket in the pedal body member.

13. The pedal of claim 11, wherein the spherical bearing mount is disposed for pivotal movement around the central pivot axis to allow the axle shaft to move laterally within the shaft cavity.

14. The pedal of claim 8, wherein the shaft bearing is a self-aligning bearing seated in an annular recess in the pedal body member.

15. A pedal comprising:
a pedal body member having a shaft cavity, the shaft cavity having a forward side and a rear side;
a self-aligning shaft bearing seated in an annular recess in the pedal body member adjacent to a left side of the pedal body member, the self-aligning shaft bearing being rotatable around a first axis;
an axle including a threaded end and a shaft, the shaft extending into the shaft cavity and being rotatably mounted to the self-aligning shaft bearing adjacent a first location on the axle shaft, the axle shaft having a longitudinal axis;
at least one distal bearing rotatably mounted to the axle shaft adjacent a second location on the axle shaft, the first location on the axle shaft being spaced apart from the second location on the axle shaft;
the pedal body member being rotatable in a first direction around the longitudinal axis of the axle shaft and in a second direction around the first axis;
a sliding bearing block secured to the axle shaft at a location spaced apart from the self-aligning shaft bearing;
a forward spring supported by the pedal body member and positioned to impart a force to move the axle shaft toward the rear side of the shaft cavity; and
a rear spring supported by the pedal body member and positioned to impart a force to move the axle shaft toward the forward side of the shaft cavity.

16. The pedal of claim 15, the forward spring being positioned to impart a force to a forward side of the sliding bearing block to move the sliding bearing block and axle shaft toward the rear side of the shaft cavity, and the rear spring being positioned to impart a force to move the sliding bearing block and axle shaft toward the forward side of the shaft cavity.

17. The pedal of claim 16, further including a forward sleeve enclosing a portion of the forward spring and having an enclosed end in contact with a forward cammed surface of the sliding bearing block, and a rear sleeve enclosing a portion of the rear spring and having an enclosed end in contact with a rear cammed surface of the sliding bearing block.

18. The pedal of claim 16, further including a spherical bearing mount secured to the pedal body member, and the shaft bearing is mounted within the spherical bearing mount.

19. The pedal of claim 18, wherein the spherical bearing mount is at least partially mounted within a machined pocket in the pedal body member.

20. The pedal of claim 18, wherein the spherical bearing mount is disposed for pivotal movement around the first axis to allow the axle shaft to move laterally within the shaft cavity.

\* \* \* \* \*